US012712178B2

(12) United States Patent
Moon et al.

(10) Patent No.: US 12,712,178 B2
(45) Date of Patent: Aug. 18, 2026

(54) COMPOSITE CATHODE ACTIVE MATERIAL, CATHODE AND LITHIUM BATTERY INCLUDING THE SAME, AND METHOD OF PREPARING THE COMPOSITE CATHODE ACTIVE MATERIAL

(71) Applicants: Samsung Electronics Co., Ltd., Suwon-si (KR); Samsung SDI Co., Ltd., Yongin-si (KR)

(72) Inventors: San Moon, Hwaseong-si (KR); Jayhyok Song, Suwon-si (KR); Sungjin Ahn, Anyang-si (KR); Donghee Yeon, Seoul (KR); Dongjin Ham, Anyang-si (KR); Jinhwan Park, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 0 days.

(21) Appl. No.: 18/314,492

(22) Filed: May 9, 2023

(65) Prior Publication Data

US 2023/0307615 A1 Sep. 28, 2023

Related U.S. Application Data

(63) Continuation of application No. 16/230,895, filed on Dec. 21, 2018, now abandoned.

(30) Foreign Application Priority Data

Jun. 4, 2018 (KR) ........................ 10-2018-0064480

(51) Int. Cl.

*H01M 4/36* (2006.01)
*H01M 4/04* (2006.01)
(Continued)

(52) U.S. Cl.

CPC ......... *H01M 4/366* (2013.01); *H01M 4/0471* (2013.01); *H01M 4/131* (2013.01);
(Continued)

(58) Field of Classification Search

None
See application file for complete search history.

(56) References Cited

U.S. PATENT DOCUMENTS 6,984,469 B2 1/2006 Kweon et al.
9,391,317 B2 7/2016 Ofer et al.
(Continued)

FOREIGN PATENT DOCUMENTS

CN 1282113 A 1/2001
CN 101423255 A 5/2009
(Continued)

OTHER PUBLICATIONS

AFCP Decision w/Art dated May 4, 2022.
(Continued)

*Primary Examiner* — Nicholas A Smith
*Assistant Examiner* — Amanda Rosenbaum
(74) *Attorney, Agent, or Firm* — CANTOR COLBURN LLP

(57) ABSTRACT

A composite cathode active material includes: a secondary including a core including a plurality of primary particles; and a shell on the core, wherein the plurality of primary particles include a nickel-containing lithium transition metal oxide doped with a first metal, and wherein at least one grain boundary between the plurality of primary particles includes a first composition including the first metal.

17 Claims, 9 Drawing Sheets

(51) Int. Cl.

| | |
|---|---|
| ***H01M 4/131*** | (2010.01) |
| ***H01M 4/1391*** | (2010.01) |
| ***H01M 4/38*** | (2006.01) |
| ***H01M 4/525*** | (2010.01) |
| ***H01M 4/62*** | (2006.01) |
| ***H01M 10/0525*** | (2010.01) |

(52) U.S. Cl.

CPC ......... *H01M 4/1391* (2013.01); *H01M 4/382* (2013.01); *H01M 4/525* (2013.01); *H01M 4/62* (2013.01); *H01M 10/0525* (2013.01)

(56) References Cited

U.S. PATENT DOCUMENTS

| | | | | |
|---|---|---|---|---|
| 9,705,125 | B2 | 7/2017 | Kelder et al. | |
| 9,899,674 | B2 | 2/2018 | Hirai et al. | |
| 9,979,014 | B2 | 5/2018 | Kim et al. | |
| 12,406,989 | B2 | 9/2025 | Park et al. | |
| 2002/0071990 | A1* | 6/2002 | Kweon ............. | C01G 45/1242 427/126.6 |
| 2002/0076613 | A1 | 6/2002 | Lee et al. | |
| 2002/0114995 | A1 | 8/2002 | Thackeray et al. | |
| 2003/0180615 | A1 | 9/2003 | Johnson et al. | |
| 2004/0229123 | A1* | 11/2004 | Takahashi ......... | H01M 10/0525 429/231.95 |
| 2006/0177737 | A1* | 8/2006 | Tode .................... | H01M 4/587 429/223 |
| 2008/0131782 | A1 | 6/2008 | Hagiwara et al. | |
| 2008/0160414 | A1* | 7/2008 | Jitsugiri ................ | C01G 51/50 429/231.1 |
| 2009/0017384 | A1 | 1/2009 | Iwasaki et al. | |
| 2011/0171530 | A1 | 7/2011 | Esaki et al. | |
| 2012/0034527 | A1 | 2/2012 | Yao et al. | |
| 2012/0282521 | A1 | 11/2012 | Choi et al. | |
| 2013/0175469 | A1 | 7/2013 | Paulsen et al. | |
| 2013/0274473 | A1 | 10/2013 | Che et al. | |
| 2014/0027670 | A1 | 1/2014 | Sun et al. | |
| 2014/0045067 | A1* | 2/2014 | Cho .................. | C01G 45/1235 429/231.95 |
| 2014/0087254 | A1* | 3/2014 | Li ...................... | C01G 45/1257 429/231 |
| 2014/0197357 | A1 | 7/2014 | Ofer et al. | |
| 2014/0377655 | A1 | 12/2014 | Mun et al. | |
| 2015/0104708 | A1* | 4/2015 | Bi ......................... | H01M 4/525 264/618 |
| 2015/0171423 | A1 | 6/2015 | Kim et al. | |
| 2015/0357638 | A1 | 12/2015 | Sun et al. | |
| 2015/0380736 | A1 | 12/2015 | Park et al. | |
| 2016/0013475 | A1* | 1/2016 | Ofer ...................... | H01M 4/364 252/182.1 |
| 2016/0181610 | A1 | 6/2016 | Shim et al. | |
| 2016/0181611 | A1 | 6/2016 | Cho et al. | |
| 2016/0240849 | A1 | 8/2016 | Kuriyama et al. | |
| 2016/0260965 | A1 | 9/2016 | Wu et al. | |
| 2016/0329563 | A1 | 11/2016 | Oh et al. | |
| 2016/0336594 | A1 | 11/2016 | Ahn et al. | |
| 2017/0069907 | A1* | 3/2017 | Zhu ....................... | H01M 4/505 |
| 2017/0077514 | A1 | 3/2017 | Cho et al. | |
| 2017/0250404 | A1 | 8/2017 | Cho | |
| 2017/0309888 | A1 | 10/2017 | Yu et al. | |
| 2017/0317342 | A1 | 11/2017 | Kang et al. | |
| 2017/0358779 | A1 | 12/2017 | Wu et al. | |
| 2017/0358797 | A1 | 12/2017 | Son et al. | |
| 2017/0358799 | A1 | 12/2017 | Gunji et al. | |
| 2018/0013130 | A1* | 1/2018 | Ochiai ................. | H01M 4/625 |
| 2018/0026268 | A1 | 1/2018 | Kim et al. | |
| 2018/0233740 | A1 | 8/2018 | You et al. | |
| 2018/0254511 | A1 | 9/2018 | Park et al. | |
| 2019/0006669 | A1 | 1/2019 | Park et al. | |
| 2019/0190063 | A1 | 6/2019 | Gogyo et al. | |
| 2019/0341598 | A1* | 11/2019 | Nam .................... | H01M 4/134 |
| 2021/0043925 | A1 | 2/2021 | Kim et al. | |

FOREIGN PATENT DOCUMENTS

| | | | |
|---|---|---|---|
| CN | 102376949 | A | 3/2012 |
| CN | 103187554 | A | 7/2013 |
| CN | 103996838 | A | 8/2014 |
| CN | 105428640 | A | 3/2016 |
| CN | 106953070 | A | 7/2017 |
| CN | 106966438 | A | 7/2017 |
| EP | 3316357 | A1 | 5/2018 |
| JP | 1999016566 | A | 1/1999 |
| JP | 2007287569 | A | 11/2007 |
| JP | 2009038021 | A | 2/2009 |
| JP | 2011171150 | A | 9/2011 |
| JP | 5223166 | B2 | 6/2013 |
| JP | 2013206679 | A * | 10/2013 |
| JP | 2014220232 | A | 11/2014 |
| JP | 2015122235 | A | 7/2015 |
| JP | 2017010842 | A | 1/2017 |
| KR | 100560534 | B1 | 3/2006 |
| KR | 100752703 | B1 | 8/2007 |
| KR | 1020120121235 | A | 11/2012 |
| KR | 1020120124779 | A | 11/2012 |
| KR | 1020140047657 | A | 4/2014 |
| KR | 101458676 | A | 6/2014 |
| KR | 1020140099218 | A | 8/2014 |
| KR | 20150070853 | A | 6/2015 |
| KR | 1020150070853 | A | 6/2015 |
| KR | 101590441 | B1 | 2/2016 |
| KR | 101630209 | B1 | 6/2016 |
| KR | 1020160074236 | A | 6/2016 |
| KR | 1020160083638 | A | 7/2016 |
| KR | 1020160134317 | A | 11/2016 |
| KR | 101726530 | B1 | 4/2017 |
| KR | 1020170045833 | A | 4/2017 |
| KR | 1020170063397 | A | 6/2017 |
| KR | 1020180010122 | A | 1/2018 |
| WO | 2016053056 | A1 | 4/2016 |

OTHER PUBLICATIONS

Chinese Office Action for Chinese Patent Application No. 201810101352.4 dated May 5, 2022.

EESR issued by the European Patent Office on Aug. 19, 2019 in the examination of the European Patent Application No. 19151570.9, which corresponds to the U.S. Application above.

English Abstract of CN 106966438.

English Translation of Office Action dated Nov. 3, 2022 issued in corresponding CN Patent Application No. 201810959129.3, 10 pp.

European Coomunication pursuant to Article 94(3) EPC for European Patent Application No. 19 151 570.9 dated Apr. 8, 2021.

Jarvis, Karalee A."The Role of Composition in the Atomic Sructure, Oxygen Loss, and Capacity of Layered Li—Mn—Ni oxide Cathodes", Journal of Material Chemistry A. vol. 2, Nov. 2013, pp. 1353-1362 year 2013.

Maitra et al., "Importance of trivalency and the eg1configuration in the photocatalytic oxidation of water by Mn and Co oxides", PNAS, vol. 110, No. 29, 2013, pp. 11704-11707.

Office Action dated Jun. 6, 2022, issued in corresponding JP Patent Application No. 2018-155308, 2 pp.

Office Action dated Nov. 3, 2022 issued in corresponding CN Patent Application No. 201810959129.3, 8 pp.

Wang et al., "Strongly phosphorescent platinum(II) complexes supported by tetradentate benzazole-containing ligands*", Journal of Materials Chemistry C, 3, 2015, pp. 8212-8218.

Yang et al., "Intergrown LiNi0.5Mn1.5O4 LiNi1/3Co1/3Mn1/3O2 composite nanorods as high-energy density cathode materials form lihium-ion batteries*", Journal of Materials Chemistry A, 1, 2013, pp. 13742-13745.

Yang-Kook SUN et al., High voltage performance of concentration-gradient Li[Ni0.67Co0/15Mn0.18]O2 cathode material for lithium-ion batteries, Electrochimica Acta 55, (Year: 2010), 8621-8627.

EP Office Action issued Sep. 28, 2023 of EP Patent Application No. 19151570.9.

(56) References Cited

OTHER PUBLICATIONS

Chinese Office Action for Chinese Patent Application No. 201811598105.6 dated Nov. 20, 2023.

* cited by examiner

COMPOSITE CATHODE ACTIVE MATERIAL, CATHODE AND LITHIUM BATTERY INCLUDING THE SAME, AND METHOD OF PREPARING THE COMPOSITE CATHODE ACTIVE MATERIAL

CROSS-REFERENCE TO RELATED APPLICATION

This application is a continuation application of U.S. patent application Ser. No. 16/230,895, filed on Dec. 21, 2018, in the U.S. Patent and Trademark Office, and claims priority to Korean Patent Application No. 10-2018-0064480, filed on Jun. 4, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a composite cathode active material, a cathode and a lithium battery, each including the composite cathode active material, and a method of preparing the composite cathode active material.

2. Description of the Related Art

To adapt to the trend toward devices having a smaller size and increased performance, it is advantageous to provide a lithium battery having a high energy density, a small size, and a low weight. That is, a lithium battery having a high capacity is desirable.

To implement such a lithium battery, research has been conducted to identify cathode active materials having high capacity. A nickel-based (e.g., nickel-containing) cathode active material may have poor lifetime characteristics and poor thermal stability due to side reactions caused by a high amount of residual surface lithium and mixing of cations.

Therefore, there is a need for a method of preventing performance deterioration in a battery including a nickel-based cathode active material.

SUMMARY

Provided is a novel composite cathode active material which may prevent performance deterioration of a battery by suppressing a side reaction on a surface of, and inside of, the composite cathode active material.

Provided is a cathode including the composite cathode active material.

Provided is a lithium battery including the cathode.

Provided is a method of preparing the composite cathode active material.

Additional aspects will be set forth in part in the description which follows and, in part, will be apparent from the description, or may be learned by practice of the presented embodiments.

According to an aspect of an embodiment, a composite cathode active material includes: a secondary particle including a core including a plurality of primary particles; and a shell on the core, wherein the plurality of primary particles include a nickel-containing lithium transition metal oxide doped with a first metal, and wherein a grain boundary between the plurality of primary particles includes a first composition including the first metal.

According to an aspect of another embodiment, a cathode includes the above-described composite cathode active material.

According to an aspect of another embodiment, a lithium battery includes the above-described cathode, an anode, and an electrolyte between the cathode and the anode.

According to an aspect of another embodiment, a method of preparing a composite cathode active material includes: providing a first solution including a first metal precursor; combining the first solution with a nickel-containing lithium transition metal oxide precursor to prepare a second solution including a precipitate; separating the precipitate from the second solution and drying the precipitate to prepare a dried product; mixing the dried product and a lithium precursor compound to prepare a mixture; and thermally treating the mixture to thereby prepare the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
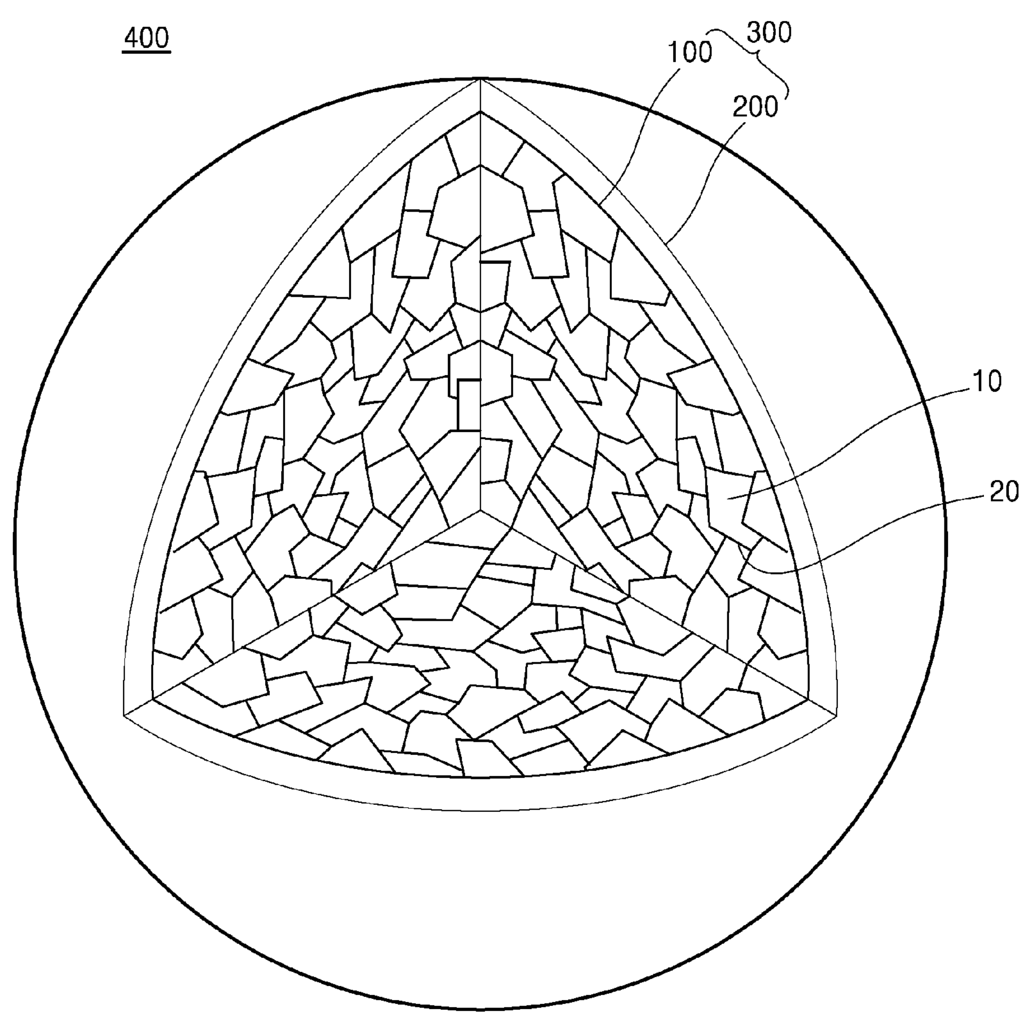
FIG. 1A is a schematic view that partially illustrates an internal structure of a composite cathode active material according to an embodiment.

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The sign "/" used herein may be construed as meaning of "and" or "or" depending on the situation. "At least one" is not to be construed as limiting "a" or "an." "Or" means "and/or." As used herein, the term "and/or" includes any and all combinations of one or more of the associated listed items.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. In contrast, when an element is referred to as being "directly on" another element, there are no intervening elements present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Hereinafter, embodiments of a composite cathode active material, a method of preparing the same, and a cathode and a lithium battery each including the composite cathode active material will be described in detail.

In accordance with an aspect of the inventive concept, a composite cathode active material includes: a core including a plurality of primary particles; and a shell on the core, wherein at least one grain boundary between the plurality of primary particles includes a first composition including a first metal, and the plurality of primary particles include a nickel-based (nickel-containing) lithium transition metal oxide, and the nickel-based lithium transition metal oxide is doped with the first metal. That is, the nickel-based lithium transition metal oxide may have a layered crystalline structure, and the nickel-based lithium transition metal oxide may be doped with the first metal. The grain boundaries may be disposed between adjacent primary particles among the plurality of primary particles. As used herein the term "grain boundary" refers to the interface between adjacent particles (grains or crystallites).

Referring to FIG. 1A, a composite cathode active material 400 according to an embodiment may include a secondary particle 300 including a core 100 and a shell 200 on the core 100. The core 100 may include a plurality of primary particles 10 and a grain boundary 20 between adjacent primary particles among the plurality of primary particles 10. For example, the primary particles 10 may be crystallites each having the same crystalline structure. The primary particles 10 may include a nickel-based lithium transition metal oxide doped with a first metal and having a layered crystalline structure. For example, the shell 200 may be a coating layer on a portion of a surface of the core 100, or on the entire surface of the core 100. The grain boundary 20 between adjacent primary particles among the plurality of primary particles 10 may include a first composition including the first metal. The secondary particle 300 may be an aggregate of the plurality of primary particles 10 (core) having a coating layer (shell) thereon.

By the inclusion of the grain boundaries 20 including the first composition between adjacent primary particles among the plurality of primary particles 10 in the core 100 of the composite cathode active material 400, lithium ion conduction within the core 100 may be facilitated, and the release of nickel ions from the primary particles 10 in the core 100 into an electrolyte solution that has permeated into the core 100, may be suppressed. A side reaction between the primary particles 10 and the electrolyte solution in the core 100 may be suppressed. Accordingly, a lithium battery including the composite cathode active material 400 may have improved cycle characteristics. A residual surface lithium content of the plurality of primary particles 10 in the core 100 may be reduced, and deterioration of the composite cathode active material 400 may be suppressed. Further, due to reduced gas generation, the lithium battery may have improved thermal stability. The first composition in the grain boundaries 20 between the adjacent primary particles 10 may prevent damage to the surface of the primary particles 10, which may occur during washing of the composite cathode active material 400, and may prevent the deterioration of lifetime characteristics in the lithium battery. The first composition, present in the grain boundaries 20 between the adjacent primary particles 10, may withstand a volume change which occurs in the primary particles during a charge/discharge process. The first composition in the grain boundaries may also suppress cracking from occurring between the primary particles 10, and suppress mechanical strength reduction of the composite cathode active material 400, thereby preventing deterioration of the lithium battery. Since the nickel-containing lithium transition metal oxide in the primary particles 10 is doped with the first metal, the nickel-containing lithium transition metal oxide may have a stabilized crystalline structure, and thus a lithium battery including the composite cathode active material may have improved cycle characteristics.

In the composite cathode active material according to one or more embodiments, an amount of nickel in the nickel-containing lithium transition metal oxide may be about 70 mole percent (mol %) or greater, about 71 mol % or greater, about 75 mol % or greater, about 80 mol % or greater, about 85 mol % or greater, about 90 mol % or greater, about 93 mol % or greater, about 95 mol % or greater, or about 97 mol % or greater based on the total moles of transition metals in the nickel-containing lithium transition metal oxide. For example, the amount of nickel in the nickel-containing lithium transition metal oxide is about 70 mol % to less than 100 mol %, or about 80 mol % to about 99 mol % or about 85 mol % to about 98 mol %. When the amount of nickel in the nickel-containing lithium transition metal oxide is about 70 mol % or greater, a high capacity may be implemented. Accordingly, a high-capacity lithium battery may be implemented.

The first composition in the grain boundaries 20 may include a first phase and a second phase. The second phase is different from the first phase. The first phase corresponds to the nickel-containing lithium transition metal oxide. In other words, the primary particle may include the first phase, and the grain boundary may include a second phase. The second phase may have, for example, a monoclinic crystalline structure. Since the first composition has the monoclinic crystalline structure, two-dimensional migration of lithium ions may be possible in the grain boundaries including the first composition, such that lithium ion conduction in the core 100 may be facilitated, thus leading to improved high-rate characteristics. The first composition may have a monoclinic crystalline structure belonging to a C2/m, C12/c1, or C2/c space group. As the first composition has a monoclinic crystalline structure belonging to the C2/m, C12/c1, or C2/c space group, a lithium battery including the composite cathode active material may have further improved cycle characteristics and thermal stability. For example, the first phase may include a phase having a trigonal crystalline structure, and the second phase may include a phase having a monoclinic crystalline structure. The first phase and the second phase may belong to different space groups. The first phase and the second phase may have different chemical compositions.

The first metal in the first composition may include, for example, Zr, Mn, Si, Mo, Pd, Co, Ni, Ti, Sn, Mo, Ir, Pt, Ru, or a combination thereof. When the first composition includes the first metal, a lithium battery including the composite cathode active material may have further improved charge/discharge characteristics.

In the composite cathode active material according to one or more embodiments, the first composition may include lithium, a first metal, and oxygen. For example, per mole of the first composition, the first composition may include about 1.7 moles to about 2.3 moles of lithium, about 0.7 mole to about 1.3 moles of the first metal, and about 2.7 moles to about 3.3 moles of oxygen. For example, per mole of the first composition, the first composition may include about 1.8 moles to about 2.2 moles of lithium, about 0.8 mole to about 1.2 moles of the first metal, and about 2.8 moles to about 3.2 moles of oxygen. For example, per mole of the first composition, the first composition may include about 1.9 moles to about 2.1 moles of lithium, about 0.9 mole to about 1.1 mole of the first metal, and about 2.9 moles to about 3.1 moles of oxygen.

The first composition may have, for example, a composition represented by Formula 1.

$$Li_aM1_bO_c \quad \text{Formula 1}$$

In Formula 1, M1 may include Zr, Mn, Si, Mo, Pd, Co, Ni, Ti, Sn, Mo, Ir, Pt, Ru, or a combination thereof, and $1.9 \le a \le 2.1$, $0.9 \le b \le 1.1$, and $2.9 \le c \le 3.1$.

In the composite cathode active material according to one or more embodiments, the core may include a first inner region and second inner region. The first inner region extends from a center of the core to halfway between the center of the core and a surface of the core, and a second inner region extends from halfway between the center of the core and the surface of the core to the surface of the core. About 50% or greater of the grain boundaries in the first inner region may include the first composition, and about 50% or greater of the grain boundaries in the second inner region may include the first composition. For example, about 51% or greater, about 55% or greater, about 60% or greater, about 70% or greater, about 80% or greater, about 85% or greater, about 90% or greater, about 95% or greater, or about 98% or greater of the grain boundaries in the first inner region may include the first composition. For example, about 51% or greater, about 55% or greater, about 60% or greater, about 70% or greater, about 80% or greater, about 85% or greater, about 90% or greater, about 95% or greater, or about 98% or greater of the grain boundaries in the second inner region may include the first composition. As referred to herein, the percentage (%) of the grain boundaries including the first composition refers to a percentage of the area of grain boundaries including the first composition with respect to a total area of the grain boundaries, as measured by exposing a cross-section of the core. That is, most of the grain boundaries in the first inner region and in the second inner region of the core may include the first composition.

In the composite cathode active material according to one or more embodiments, the core may include the first composition dispersed at a uniform concentration throughout the core. In some embodiments, the first composition may have a continuous or discontinuous concentration gradient that changes from a center portion to a surface portion of the core. For example, a concentration of the first composition in the first inner region of the core may be lower than that a concentration of the first composition in the second inner region of the core. For example, a concentration of the first composition in the first inner region of the core may be greater than a concentration of the first composition in the second inner region of the core. The first composition may be discontinuously dispersed inside of the core.

Figure 1B:
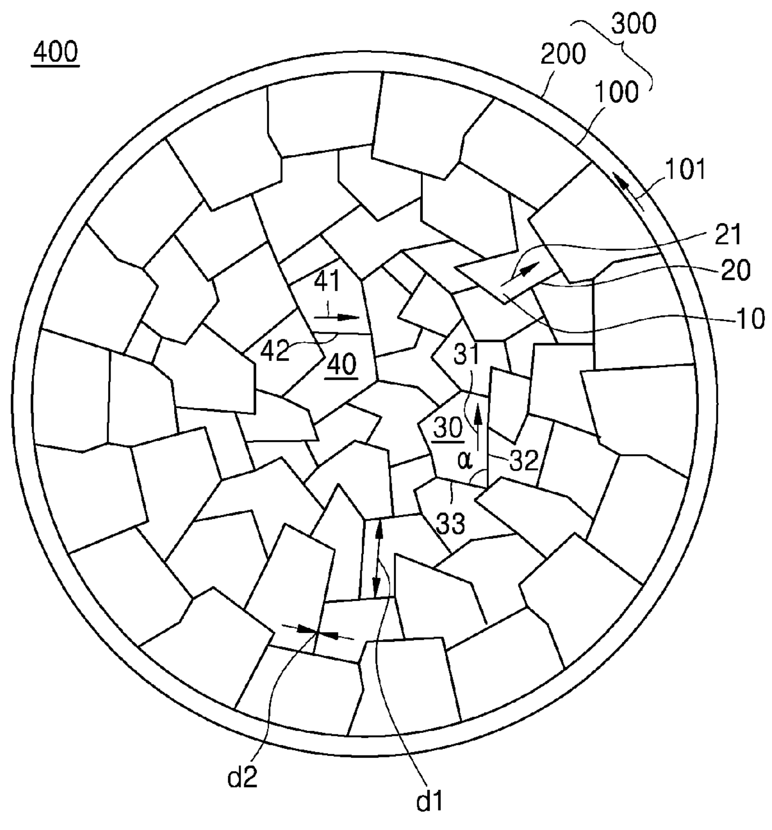
FIG. 1B is a schematic cross-sectional view of a composite cathode active material according to an embodiment.

Referring to FIG. 1B, in the core 100 of the composite cathode active material 400, the grain boundaries 20 may have a substantially rectilinear form. Since the primary particles 10 adjacent to the grain boundaries 20 include the nickel-based (nickel containing) lithium transition metal oxide having a layered crystalline structure, the primary particles 10 may have a polyhedral shape, and thus the grain boundary 20 between adjacent primary particles 10 may have a rectilinear form.

Referring to FIG. 1B, in the composite cathode active material 400, the grain boundary 20 in the core 100 may extend in a direction 21 parallel to a surface of the adjacent primary particle 10, and the direction 21 in which the grain boundary 20 is extended may be different from a tangential direction 101 of a nearest outer surface of the core 100. That is, the grain boundary may extend in a direction different from a tangential direction 101 of the outer surface of the core.

Referring to FIG. 1B, in the composite cathode active material 400, the core 100 may include a first grain boundary 32 and a second grain boundary 33. Each of the first grain boundary 32 and the second grain boundary 33 may be directly adjacent to the same primary particle 30 among the plurality of primary particles 10, and the first grain boundary 32 and the second grain boundary 33 may intersect at an angle (α) that is determined by a shape of the primary particle 30. The angle (α) at which the first grain boundary 32 and the second grain boundary 33 intersect may be in a range of greater than about 0 degree to less than about 180 degrees, or, for example, about 10 degrees to about 170 degrees, about 20 degrees to about 160 degrees, about 30 degrees to about 150 degrees, about 40 degrees to about 140 degrees, about 50 degrees to about 130 degrees, about 60 degrees to about 120 degrees, about 70 degrees to about 110 degrees, or about 80 degrees to about 110 degrees.

Referring to FIG. 1B, in the composite cathode active material 400, the core 100 may include a plurality of grain boundaries 32 and 42 amongst (adjacent to) the plurality of primary particles 30 and 40. Each grain boundary of the plurality of grain boundaries 32 and 42 extends in directions 31 and 41 that are parallel to surfaces of the primary particles 30 and 40 adjacent to the plurality of grain boundaries 32 and 42. Also, each grain boundary of the plurality of grain boundaries 32 and 42, extends in a different direction from each other.

Referring to FIG. 1B, in the composite cathode active material 400, the grain boundaries 20, 32, and 42 may have an average grain boundary length in a range of about 50 nanometers (nm) to about 1000 nm and an average grain boundary thickness in a range of about 1 nm to about 200 nm. Length directions 21, 31, and 41 of the grain boundaries may be parallel to surfaces of the adjacent primary particles 10, 30, and 40, and a thickness direction of the grain boundaries 20, 32, and 42 may be perpendicular to surfaces of the adjacent primary particles 10, 30, and 40. For example, the average grain boundary length may be in a range of about 50 nm to about 950 nm, about 100 nm to about 900 nm, about 150 nm to about 800 nm, or about 200 nm to about 700 nm. For example, the average grain boundary thickness may be in a range of about 2 nm to about 100 nm, about 5 nm to about 100 nm, about 10 nm to about 100 nm, or about 20 nm to about 100 nm. When the average grain boundary length and the average grain boundary thickness are within these ranges, further improved charge/discharge characteristics may be provided. The average grain boundary length may refer to an average of the lengths d1 of the grain boundaries extending in a direction. The average grain boundary thickness may refer to an average of the thicknesses d2 of the grain boundaries.

In the composite cathode active material according to one or more embodiments, an average particle diameter of the primary particles may be in a range of about 50 nm to about 500 nm, about 50 nm to about 450 nm, about 50 nm to about 400 nm, about 50 nm to about 350 nm, about 50 nm to about 300 nm, about 50 nm to about 250 nm, or about 50 nm to about 200 nm. However, embodiments are not limited thereto. The average particle diameter of the primary particles 10 may be varied as long as it provides improved charge/discharge characteristics. As used herein, average particle diameter refers to a size, e.g., a dimension, such as a length or width dimension, as measured along a major surface.

In the composite cathode active material according to one or more embodiments, an average particle diameter of the core, corresponding to the aggregate of the plurality of primary particles, may be in a range of about 1 micrometer (μm) to about 30 μm, about 2 μm to about 28 μm, about 4 μm to about 26 μm, about 6 μm to about 24 μm, about 8 μm to about 22 μm, about 10 μm to about 20 μm, about 12 μm to about 18 μm, about 12 μm to about 16 μm, or about 13 μm to about 15 μm. However, embodiments are not limited thereto. The average particle diameter of the core 100 may be varied as long as it may provide improved charge/discharge characteristics.

In the composite cathode active material according to one or more embodiments, the shell may include the first composition including the first metal. The first composition may be disposed in the shell, which is present on the surface of the core, as well as in the grain boundaries of the core. In some embodiments, the first composition may form the shell, which is provided as a coating of the surface of the core. The first composition in the shell may have the same composition and the same crystalline structure as the first composition disposed in the grain boundaries of the core. For example, the first composition in the shell may have a monoclinic crystalline structure belonging to the C2/m, C12/c1, or C2/c space group. For example, the first composition in the shell may have the composition represented by Formula 1 as described above.

In the composite cathode active material according to one or more embodiments, the shell may further include a second composition including a second metal, the second composition having the same or different composition and/or the same or different crystalline structure as those of the first composition, as long as it does not deteriorate charge/discharge characteristics of the lithium battery. That is, the shell may include the second composition in addition to the first composition. The second composition may have an amorphous structure, a layered crystalline structure, a spinel crystalline structure, an olivine crystalline structure, or a combination thereof. By the additional inclusion of the second composition, a residual surface lithium content of the core may be reduced, and a side reaction between the core and the electrolyte may be more effectively prevented. The second metal in the second composition may include Zr, Co, Mg, Mn, Si, Mo, Pd, Co, Ni, Ti, Sn, Mo, Ir, Pt, Ru, or a combination thereof. However, embodiments are not limited thereto. Any metal that may be capable of improving the cycle characteristics of the composite active material by being coated on the surface of the core may be used.

In the composite cathode active material according to one or more embodiments, the shell may have a multilayer structure including a first coating layer containing the first composition and a second coating layer containing the second composition. The first coating layer and the second coating layer may be sequentially stacked on the surface of the core, may be arranged in different regions parallel to one another on the surface of the core, or may have a combination of these stacked and parallel configurations.

In the composite cathode active material according to one or more embodiments, the shell may have a thickness of about 300 nm or less, about 250 nm or less, about 200 nm or less, about 150 nm or less, about 100 nm or less, about 90 nm or less, about 80 nm or less, about 70 nm or less, about 60 nm or less, about 50 nm or less, about 40 nm or less, about 30 nm or less, about 20 nm or less, or about 10 nm or less, or from about 1 nm to about 300 nm, or from about 5 nm to about 200 nm, or from about 5 nm to about 100 nm. When the thickness of the shell is within these ranges, a lithium battery including the composite cathode active material may have further improved cycle characteristics and thermal stability.

In the composite cathode active material according to one or more embodiments, a total amount of the first metal in the secondary particles including the core and the shell may be about 2 mol % or less, about 1.5 mol % or less, about 1.0 mol % or less, about 0.95 mol % or less, about 0.9 mol % or less, about 0.85 mol % or less, about 0.8 mol % or less, about 0.75 mol % or less, about 0.7 mol % or less, about 0.65 mol % or less, or about 0.6 mol % or less, with respect to the total number of moles of the transition metal and the first metal of the nickel-containing lithium transition metal oxide. For example, the amount of the first metal in the second particles including the core and the shell may be about 0.01 mol % or greater, about 0.05 mol % or greater, about 0.1 mol % or greater, about 0.15 mol % or greater, about 0.2 mol % or greater, or about 0.25 mol % or greater, with respect to a total number of moles of the transition metal and the first metal in the nickel-containing lithium transition metal oxide. When the amount of the first metal is within these ranges, a lithium battery including the composite cathode active material may have further improved cycle characteristics and thermal stability.

In the composite cathode active material according to one or more embodiments, the nickel-containing lithium transition metal oxide may include lithium, nickel, the first metal, an additional (third) metal, and oxygen. The additional (third) metal may refer to any metal other than lithium, nickel, and the first metal, and may be, for example a transition metal.

In the composite cathode active material according to one or more embodiments, per mole of the nickel-containing lithium transition metal oxide, the nickel-containing lithium transition metal oxide may include about 0.1 mole to about 1.3 moles of lithium, about 0.7 mole to about 0.99 mole of nickel, about 0.001 mole to about 0.01 mole of the first metal, about 0.01 mole to about 0.3 mole of the additional (third) transition metal, and about 1.7 moles to about 2.3 moles of oxygen. For example, per mole of the nickel-containing lithium transition metal oxide, the nickel-containing lithium transition metal oxide may include about 0.7 mole to about 1.3 moles of lithium, about 0.7 mole to about 0.99 mole of nickel, about 0.001 mole to about 0.01 mole of the first metal, about 0.01 mole to about 0.3 mole of the additional (third) transition metal, and about 1.7 moles to about 2.3 moles of oxygen.

For example, the nickel-containing lithium transition metal oxide may be represented by Formula 2.

$$Li_aMO_2 \qquad \text{Formula 2}$$

In Formula 2, $0.9 \leq a \leq 1.1$, M may include nickel, a first metal, and at least one other element selected from Group 2 to Group 13 elements other than the first metal, and a nickel content in M may be about 70 mol % to less than 100 mol %.

For example, the nickel-containing lithium transition metal oxide may be represented by Formula 3.

$$Li_aNi_bM1_cM2_dM3_eO_2 \qquad \text{Formula 3}$$

In Formula 3, $0.9 \leq a \leq 1.1$, $0.7 < b < 1.0$, $0 < c < 0.3$, $0 < d < 0.3$, $0 \leq e < 0.1$, $b+c+d+e=1$, and M1, M2, and M3 may differ from one another and may each be independently an element selected from manganese (Mn), vanadium (V), chromium (Cr), iron (Fe), cobalt (Co), zirconium (Zr), rhenium (Re), aluminum (Al), boron (B), ruthenium (Ru), titanium (Ti), niobium (Nb), molybdenum (Mo), magnesium (Mg), and platinum (Pt). The nickel-containing lithium transition metal oxide of Formula 3 includes a first metal as a dopant in the nickel-containing lithium transition metal oxide.

For example, the nickel-containing lithium transition metal oxide may be represented by Formula 4:

$$Li_aNi_bCo_cMn_dM3_eO_2 \qquad \text{Formula 4}$$

In Formula 4, $0.9 \leq a \leq 1.1$, $0.7 < b < 1.0$, $0 < c < 0.3$, $0 < d < 0.3$, $0 \leq e < 0.1$, $b+c+d+e=1$, and M3 may include zirconium (Zr), vanadium (V), chromium (Cr), iron (Fe), rhenium (Re), aluminum (Al), boron (B), ruthenium (Ru), titanium (Ti), niobium (Nb), molybdenum (Mo), magnesium (Mg), platinum (Pt), or a combination thereof. The nickel-containing lithium transition metal oxide of Formula 4 includes a first metal as a dopant in the nickel-containing lithium transition metal oxide.

In the composite cathode active material according to one or more embodiments, the nickel-containing lithium transition metal oxide may include at least one of a first layered crystalline phase belonging to the C2/m, C12/c1, or C2/c space group, and a second layered crystalline phase belonging to the R-3m space group. The nickel-containing lithium transition metal oxide according to one or more embodiments may be a composite of the first layered crystalline phase and the second layered crystalline phase.

For example, the nickel-containing lithium transition metal oxide may include a first layered crystalline phase having a composition represented by Formula 4a and belonging to the C2/m, C12/c1, or C2/c space group, and a second layered crystalline phase having a composition represented by Formula 4b and belonging to the R-3m space group.

$$Li_2MnO_3 \qquad \text{Formula 4a}$$

$$LiMO_2 \qquad \text{Formula 4b}$$

In Formulae 4a and 4b,

M may be at least two elements selected from nickel (Ni), cobalt (Co), manganese (Mn), vanadium (V), chromium (Cr), iron (Fe), zirconium (Zr), rhenium (Re), aluminum (Al), boron (B), ruthenium (Ru), titanium (Ti), niobium (Nb), molybdenum (Mo), magnesium (Mg), and platinum (Pt). At least a portion of M may be Ni. The amount of Ni in M may be about 70 mol % or greater, for example, about 71 mol % or greater, about 75 mol % or greater, about 80 mol % or greater, about 85 mol % or greater, about 90 mol % or greater, about 93 mol % or greater, about 95 mol % or greater, or about 97 mol % or greater, based on the total moles of the elements in M. The second layered crystalline phase of Formula 4b may be doped with a first metal.

For example, the nickel-containing lithium transition metal oxide may be represented by Formula 5.

$$aLi_2MnO_{3\text{-}}(1-a)LiMO_2 \qquad \text{Formula 5}$$

In Formula 5, $0 < a < 1$, and M may include at least two elements selected from nickel (Ni), cobalt (Co), manganese (Mn), vanadium (V), chromium (Cr), iron (Fe), zirconium (Zr), rhenium (Re), aluminum (Al), boron (B), ruthenium (Ru), titanium (Ti), niobium (Nb), molybdenum (Mo), magnesium (Mg), and platinum (Pt). At least a portion of M may be Ni. A Ni content in M may be about 70 mol % or greater, for example, about 71 mol % or greater, about 75 mol % or greater, about 80 mol % or greater, about 85 mol % or greater, about 90 mol % or greater, about 93 mol % or greater, about 95 mol % or greater, or about 97 mol % or greater, based on the total moles of the elements in M. The nickel-containing lithium transition metal oxide of Formula 5 includes a first metal which is doped in the nickel-containing lithium transition metal oxide.

In the composite cathode active material according to one or more embodiments, the area of pores in a cross-section of the composite cathode active material, before use in a lithium battery, i.e., not subjected to charging and discharging, may be 1% or less, about 0.95% or less, about 0.90% or less, about 0.85% or less, or about 0.80% or less of a total area of the cross-section. The area of pores in the total area of the cross-section of the composite cathode active material corresponds to a porosity. As used herein, the term "porosity" is used to refer to a measure of the empty space (i.e., voids or pores) in the secondary particle and is represented by Equation 1.

Porosity [%]=(Area occupied by pores/Total cross-sectional area of a secondary particle)×100%

Figure 5A:
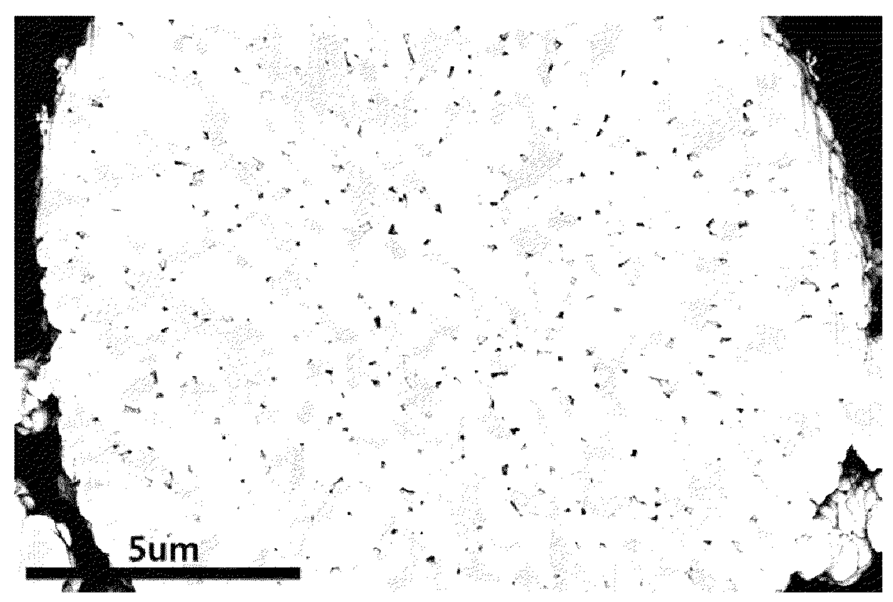
FIG. 5A is a scanning electron microscope (SEM) image of a cross-section of the second composite cathode active material prepared in Comparative Example 3 before being assembled into a lithium battery.
Figure 5B:
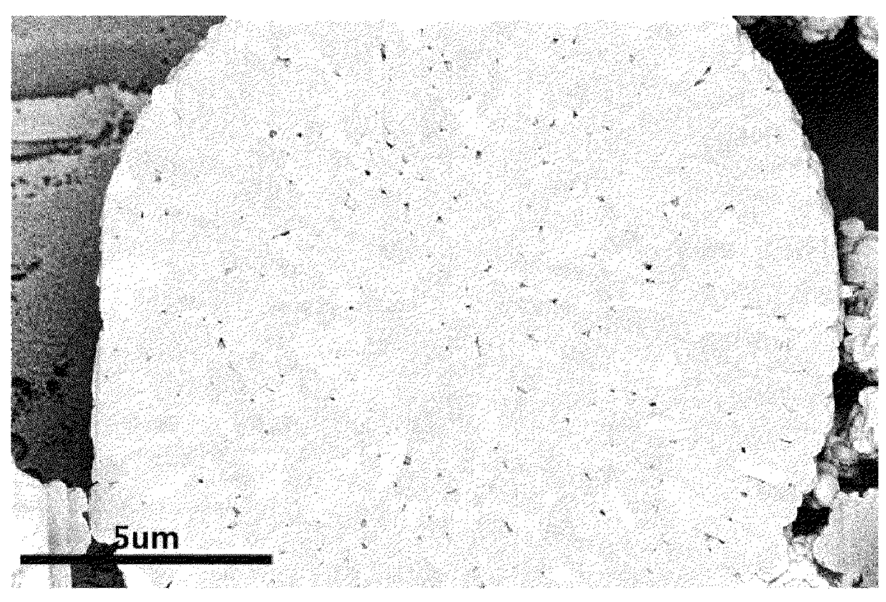
FIG. 5B is a SEM image of a cross-section of the second composite cathode active material prepared in Example 2 before being assembled into a lithium battery.

In Equation 1, the area occupied by pores refers to a total area of the pores in the secondary particle, and which appears as black dots in FIGS. 5A and 5B.

In accordance with another aspect of the inventive concept, a cathode includes a composite cathode active material according to any of the above-described embodiments.

The cathode may be prepared as follows. A composite cathode active material according to any of the above-described embodiments, a conducting agent, a binder, and a solvent may be mixed together to prepare a cathode active material composition. The cathode active material composition may be directly coated on an aluminum current collector to prepare a cathode plate having a cathode active material film. In some embodiments, the cathode active material composition may be cast on a separate support to form a cathode active material film. This cathode active material film may then be separated from the support and laminated on an aluminum current collector to prepare a cathode plate (or a cathode) having the cathode active material film.

The conducting agent may include carbon black, graphite particulates, natural graphite, artificial graphite, acetylene black, Ketjen black, carbon fibers, carbon nanotubes, a metal powder, metal fiber, or metal tubes of copper, nickel, aluminum, or silver, or a conducting polymer such as a polyphenylene derivative, or a combination thereof, but embodiments are not limited thereto. Any material suitable for use as a conducting agent may be used.

Examples of the binder include a vinylidene fluoride/hexafluoropropylene copolymer, polyvinylidene fluoride (PVDF), polyacrylonitrile, polymethyl methacrylate, polytetrafluoroethylene (PTFE), a styrene-butadiene rubber polymer, or a combination thereof, but embodiments are not limited thereto. Any material suitable for use as a binding agent may be used. Examples of the solvent include N-methyl-pyrrolidone (NMP), acetone, or water, but embodiments are not limited thereto. Any material suitable for use as a solvent may be used.

In some embodiments, pores may be formed in the cathode plate by further adding a plasticizing agent to the cathode active material composition.

The amounts of the composite cathode active material, the conducting agent, the binder, and the solvent may be determined by those of skill in the art without undue experimentation. At least one of the conducting agent, the binder, and the solvent may be omitted according to the use and the structure of the lithium secondary battery.

The cathode may include an additional (e.g., second) cathode active material in addition to the composite cathode active material used above.

The second cathode active material may be any material suitable for use as a cathode active material for a lithium battery and, may be for example, a lithium-containing metal oxide. For example, the second cathode active material may include a lithium composite oxide including a metal selected from among Co, Mn, Ni, or a combination thereof. In some embodiments, the second cathode active material may be a compound represented by one of the following formulae: $Li_aA_{1-b}B_bD_2$ (wherein 0.90≤a≤1 and 0≤b≤0.5); $Li_aE_{1-b}B_bO_{2-c}D_c$ (wherein 0.90≤a≤1, 0≤b≤0.5, and 0≤c≤0.05); $LiE_{2-b}B_bO_{4-c}D_c$ (wherein 0 b≤0.5 and 0≤c≤0.05); $Li_aNi_{1-b-c}Co_bB_cD_a$ (wherein 0.90≤a≤1, 0≤b≤0.5, 0≤c≤0.05, and 0<α≤2); $Li_aNi_{1-b-c}Co_bB_cO_{2-\alpha}F_\alpha$ (wherein 0.90≤a≤1, 0≤b≤0.5, 0≤c≤0.05, and 0<α<2); $Li_aNi_{1-b-c}Co_bB_cO_{2-\alpha}F_2$ (wherein 0.90≤a≤1, 0≤b≤0.5, 0≤c≤0.05, and 0<α<2); $Li_aNi_{1-b-c}Mn_bB_cD_\alpha$ (wherein 0.90≤a≤1, 0≤b≤0.5, 0≤c≤0.05, and 0<α≤2); $Li_aNi_{1-b-c}Mn_bB_cO_{2-\alpha}F_\alpha$ (wherein 0.90≤a≤1, 0≤b≤0.5, 0≤c≤0.05, and 0<α<2); $Li_aNi_{1-b-c}Mn_bB_cO_{2-\alpha}F_2$ (wherein 0.90≤a≤1, 0≤b≤0.5, 0≤c≤0.05, and 0<α<2); $Li_aNi_bE_cG_dO_2$ (wherein 0.90≤a≤1, 0≤b≤0.9, 0≤c≤0.5, and 0.001≤d≤0.1); $Li_aNi_bCo_cMn_dG_eO_2$ (wherein 0.90≤a≤1, 0≤b≤0.9, 0≤c≤0.5, 0≤d≤0.5, and 0.001≤e≤0.1); $Li_aNiG_bO_2$ (wherein 0.90≤a≤1 and 0.001≤b≤0.1); $Li_aCoG_bO_2$ (wherein 0.90≤a≤1 and 0.001≤b≤0.1); $Li_aMnG_bO_2$ (wherein 0.90≤a≤1 and 0.001≤b≤0.1); $Li_aMn_2G_bO_4$ (wherein 0.90≤a≤1 and 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); and $LiFePO_4$. A combination comprising at least one of the foregoing may also be used.

In the formulae above, A may include nickel (Ni), cobalt (Co), manganese (Mn), or a combination thereof; B may include aluminum (Al), nickel (Ni), cobalt (Co), manganese (Mn), chromium (Cr), iron (Fe), magnesium (Mg), strontium (Sr), vanadium (V), a rare earth element, or a combination thereof; D may include oxygen (O), fluorine (F), sulfur (S), phosphorus (P), or a combination thereof; E may include cobalt (Co), manganese (Mn), or a combination thereof; F may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

The compounds listed above as second cathode active materials may have a surface coating layer (hereinafter, also referred to as "coating layer"). In other embodiments, a mixture of a compound without a coating layer and a compound having a coating layer, the compounds being selected from the compounds listed above, may be used. In some embodiments, the coating layer may include a compound of a coating element, for example, an oxide, a hydroxide, an oxyhydroxide, an oxycarbonate, and/or a hydroxycarbonate of the coating element. In some embodiments, the compounds for the coating layer may be amorphous or crystalline. In some embodiments, the coating element for the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed on a surface of the second cathode active material using any method that does not adversely affect the physical properties of the cathode active material when a compound of the coating element is used. For example, the coating layer may be formed using a spray coating method or a dipping method. The coating methods are well understood by those of ordinary skill in the art, and thus a detailed description thereof will be omitted.

According to another embodiment, a lithium battery may include a cathode including a composite cathode active material according to any of the above-described embodiments. The lithium battery may be prepared in the following manner.

First, a cathode may be prepared according to the above-described method.

Next, an anode may be prepared as follows. The anode may be prepared in the same manner as applied to the cathode, except that an anode active material is used instead of the composite cathode active material. A conducting agent, a binder, and a solvent, which may be used to prepare an anode active material composition, may be the same as those used to prepare the cathode active material composition.

For example, an anode active material, a conducting agent, a binder, and a solvent may be mixed together to prepare the anode active material composition. The anode active material composition may be directly coated on a copper current collector to prepare an anode plate (or an anode). In some embodiments, the anode active material composition may be cast on a separate support to form an anode active material film. This anode active material film may then be separated from the support and laminated on a copper current collector to prepare an anode plate.

The anode active material may be any material suitable for use as an anode active material for a lithium battery. Examples of the anode active material may include lithium metal, a metal alloyable with lithium, a transition metal oxide, a non-transition metal oxide, a carbonaceous material, or a combination thereof.

For example, the metal alloyable with lithium may be Si, Sn, Al, Ge, Pb, Bi, Sb, an Si—Y' alloy (wherein Y' may be an alkali metal, an alkaline earth metal, a Group 13 element, a Group 14 element, a Group 15 element, a Group 16 element, a transition metal, a rare earth element, or a combination thereof, but is not Si), an Sn—Y' alloy (wherein Y' may be an alkali metal, an alkaline earth metal, a Group 13 element, a Group 14 element, a Group 15 element, a Group 16 element, a transition metal, a rare earth element, or a combination thereof, but is not Sn), or a combination thereof. Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (wherein $0<x<2$).

The carbonaceous material may be crystalline carbon, amorphous carbon, or a combination thereof. Examples of the crystalline carbon may include graphite, such as natural graphite or artificial graphite in nonshaped, plate, flake, spherical, or fibrous form. Examples of the amorphous carbon may include soft carbon (carbon calcined at a low temperature), hard carbon, meso-phase pitch carbonization product, and calcined cokes.

The amounts of the anode active material, the conducting agent, the binder, and the solvent may be determined by those of skill in the art without undue experimentation.

Next, a separator to be disposed between the cathode and the anode may be prepared. The separator for the lithium battery may be any separator suitable for use in a lithium battery. In some embodiments, the separator may have low resistance to migration of ions in an electrolyte and have good electrolyte-retaining ability. Examples of the separator include glass fiber, polyester, Teflon™, polyethylene, polypropylene, PTFE, or a combination thereof, each of which may be a non-woven fabric or a woven fabric. For example, a rollable separator including polyethylene or polypropylene may be used for a lithium ion battery. A separator having good organic electrolyte solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and dried to form the separator. In some embodiments, the separator composition may be cast on a support and then dried to form a separator film. This separator film may then be separated from the support and laminated on an electrode to form the separator.

The polymer resin used to manufacture the separator may be any material suitable for use as a binder for an electrode plate. Examples of the polymer resin include a vinylidene-fluoride/hexafluoropropylene copolymer, PVDF, polyacrylonitrile, polymethylmethacrylate, or a combination thereof.

Then, an electrolyte is prepared.

In some embodiments, the electrolyte may be an organic electrolyte solution. In some embodiments, the electrolyte may be in a solid phase. Examples of the electrolyte are lithium oxide and lithium oxynitride. Any material suitable for use as a solid electrolyte may be used. In some embodiments, the solid electrolyte may be formed on the anode by, for example, sputtering.

In some embodiments, the organic electrolyte solution may be prepared by dissolving a lithium salt in an organic solvent.

The organic solvent may be any solvent suitable for use as an organic solvent in a lithium battery. In some embodiments, the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-m ethyltetrahydrofuran, γ-butyrolactone, dioxolane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

In some embodiments, the lithium salt may be any material suitable for use as a lithium salt in a lithium battery. In some embodiments, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each independently be a natural number), LiCl, LiI, or a combination thereof.

Figure 6:
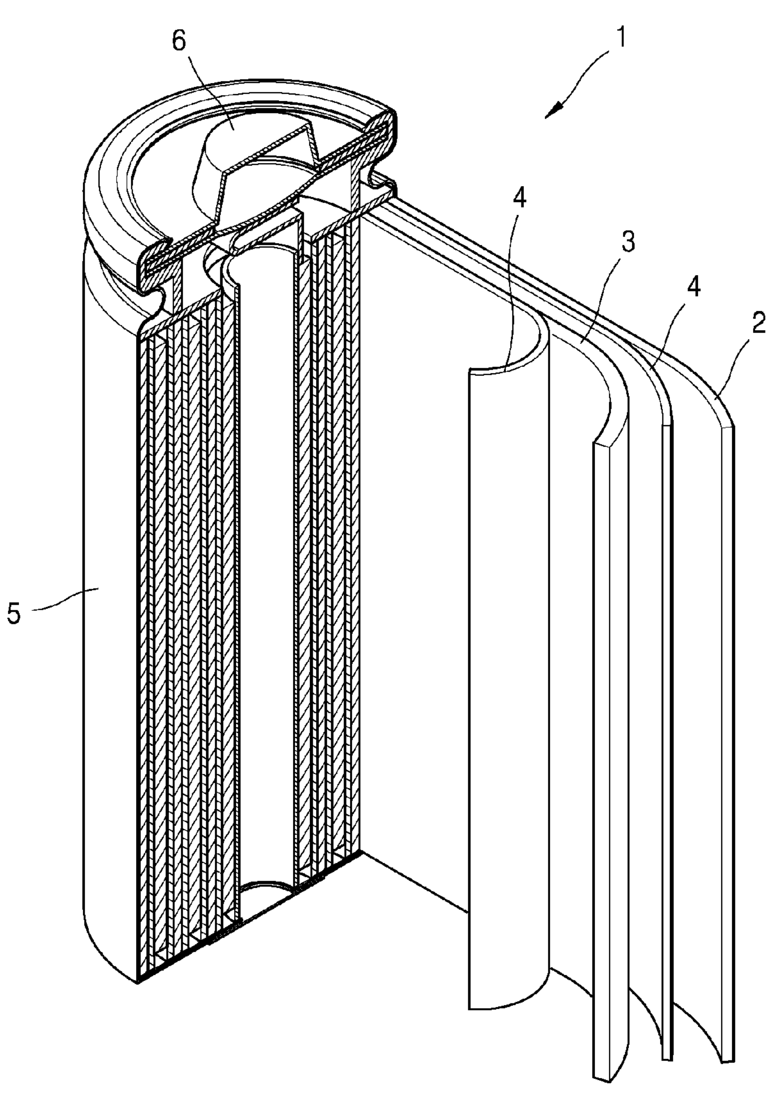
FIG. 6 is a schematic view of a lithium battery according to an embodiment.

Referring to FIG. 6, a lithium battery 1 according to an embodiment may include a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolyte solution and sealed with a cap assembly 6, thereby completing the manufacture of the lithium battery 1. In some embodiments, the battery case 5 may have a cylindrical, rectangular, or thin-film shape. For example, the lithium battery 1 may be a large-sized thin-film-type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolyte solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that benefits from high capacity and high output, for example, in a laptop computer, a smartphone, or an electric vehicle.

The lithium battery 1 may have improved lifetime characteristics and high-rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

In accordance with another aspect of the inventive concept, a method of preparing the composite cathode active material according to the one or more embodiments include: providing (e.g., preparing) a first solution including a first metal precursor; combining (e.g. mixing) the first solution and a nickel-containing lithium transition metal oxide precursor to prepare a second solution including a precipitate; separating the precipitate from the second solution and drying the precipitate to prepare a dried product; mixing the dried product and a lithium precursor compound to prepare a mixture; and thermally treating the mixture to thereby prepare the composite cathode active material.

The first metal precursor may be an oxychloride, oxynitrate, or nitrate of the first metal. However, embodiments are not limited thereto. The first metal precursor may be any suitable dissociative salt including the first metal. For example, the first metal precursor may include $ZrO(NO_3)_2$, $ZrO(NO_3)_2 \cdot H_2O$, $Zr(NO_3)_2$, $ZrOCl_2$, $ZrOCl_2 \cdot H_2O$, or a combination thereof. The first solution and the second solution may include a solvent that may dissolve the first metal precursor and the nickel-containing lithium transition metal oxide precursor. The type of solvent is not specifically limited, and any suitable solvent may be used. For example, the solvent may be distilled water.

In the preparing of the second solution, an amount of the first solution may be about 500 parts by weight or less, about 400 parts by weight or less, about 300 parts by weight or less, about 200 parts by weight or less, about 100 parts by weight or less, about 50 parts by weight or less, about 45 parts by weight or less, about 40 parts by weight or less, about 35 parts by weight or less, about 30 parts by weight or less, about 25 parts by weight or less, about 20 parts by weight or less, or about 10 parts by weight or less, each with respect to 100 parts by weight of the nickel-containing lithium transition metal oxide precursor. For example, the amount of the first solution may be about 10 parts by weight to about 500 parts by weight, or about 50 parts by weight to about 300 parts by weight, or about 50 parts by weight to about 200 parts by weight. When the concentration of the nickel-containing lithium transition metal oxide precursor in the second solution is increased, the first metal may be uniformly distributed on the surface and the inside of the composite cathode active material.

An amount of the first metal precursor in the second solution may be about 0.1 mole or less, about 0.05 mole or less, about 0.03 mole or less, about 0.02 mole or less, or about 0.01 mole or less, per mole of the nickel-containing lithium transition metal oxide precursor. For example, the amount of the first metal precursor in the second solution may be about 0.005 mole to about 0.1 mole, or about 0.005 mole to about 0.05 mole, or about 0.02 mole to about 0.05 mole, per mole of the nickel-containing lithium transition metal oxide precursor.

In the preparing of the dried product, the precipitate may be separated from the second solution by removing the solvent from the second solution. The precipitate may then be dried in an oven at a temperature of about 120° C. to about 150° C. for about 1 hour to about 30 hours to prepare the dried product. However, the temperature or time range is not limited thereto. The temperature and the time may be varied in order to prepare the dried product from the precipitate, as long as the temperature and/or time do not interfere with the formation of the first composition including the first metal on the core surface and in the grain boundaries inside the core of the composite cathode active material, and doping of the first metal in the nickel-containing lithium transition metal oxide.

The thermal treating of the dried product may be performed at a temperature in a range of about 650° C. to about 800° C., about 650° C. to about 750° C., or about 700° C. to about 750° C., under an oxidative atmosphere including an oxidative gas such as oxygen or air. The thermal treatment time may be in a range of about 3 hours to about 20 hours, about 3 hours to about 15 hours, about 3 hours to about 10 hours, about 3 hours to about 7 hours, or about 4 hours to about 6 hours. However, the temperature, atmosphere, or thermal treatment time are not limited thereto and may be varied within the scope to facilitate formation of the first composition including the first metal on the core surface and in the grain boundaries inside the core of the composite cathode active material, and doping of the first metal in the nickel-containing lithium transition metal oxide.

In the method of preparing the composite cathode active material according to one or more embodiments, a porosity of the composite cathode active material may be less than a porosity of the nickel-containing lithium transition metal oxide precursor. That is, the composite cathode active material may have a more compact structure than the nickel-containing lithium transition metal oxide precursor. The primary particles of the nickel-containing lithium transition metal oxide precursor may have a needle shape (needle-like). Due to the inclusion of the needle-like shaped primary particles, the nickel-containing lithium transition metal oxide precursor may have a high porosity. However, due to the formation of the first composition at grain boundaries between the primary particles of the nickel-containing lithium transition metal oxide precursor, the pores between the primary particles in the composite cathode active material may be reduced.

One or more embodiments of the present disclosure will now be described in detail with reference to the following examples. However, these examples are only for illustrative purposes and are not intended to limit the scope of the one or more embodiments of the present disclosure.

EXAMPLES (Preparation of Composite Cathode Active Material)

Example 1: Ni88+Zr 0.3Mol %, Wet Method (Preparation of First Composite Cathode Active Material: Before Washing)

A first aqueous solution of zirconium oxynitrate ($ZrO(NO_3)_2$) as a first metal precursor dissolved in distilled water was prepared. $Ni_{0.88}Co_{0.08}Mn_{0.04}\cdot(OH)_2$ (Reshine New Material, Co, Ltd., China) powder, as a nickel-containing lithium transition metal oxide precursor, was added into the first aqueous solution and stirred at about 25° C. for about 10 minutes to prepare a second aqueous solution. A molar ratio of $Ni_{0.88}Co_{0.08}Mn_{0.04}(OH)_2$ to zirconium oxynitrate in the second aqueous solution was about 1:0.003. In the second aqueous solution, 100 parts by weight of the nickel-containing lithium transition metal oxide precursor ($Ni_{0.88}Co_{0.08}Mn_{0.04}\cdot(OH)_2$) with respect to 100 parts by weight of distilled water was added. The added $Ni_{0.88}Co_{0.08}Mn_{0.04}(OH)_2$ powder included secondary particles including aggregated primary particles having a needle-like shape. A co-precipitate of zirconium oxynitrate and $Ni_{0.88}Co_{0.08}Mn_{0.04}(OH)_2$ was filtered from the second aqueous solution. The filtered co-precipitate was dried in an oven at about 120° C. for about 12 hours. The dried co-precipitate (Zr-coprecipitated $Ni_{0.88}Co_{0.08}Mn_{0.04}(OH)_2$) and LiOH $H_2O$ as a lithium precursor were mixed in a molar ratio of about 1:1 to about 1:1.09 to prepare a mixture. The mixture was put into a furnace and then thermally treated at about 750° C. for about 20 hours while oxygen was flowed thereinto (primary thermal treatment) to thereby prepare a first composite cathode active material.

Through the primary thermal treatment, a Zr-doped $Li(Ni_{0.88}Co_{0.08}Mn_{0.04})_{1-x}Zr_xO_2$ (wherein $0<x<0.003$) core was obtained, and a $Li_2ZrO_3$ coating layer having a monoclinic crystalline structure was formed in the grain boundaries between adjacent primary particles among the plurality of primary particles inside of the core, and on the surface of the core.

(Preparation of Second Composite Cathode Active Material: After Washing)

A washing step, wherein 100 parts by weight of distilled water was added to 100 parts by weight of the first composite cathode active material, stirred, and then removed to remove residual lithium, was conducted one time. Subsequently, 100 parts by weight of the first composite cathode active material was added to 100 parts by weight of distilled water and stirred for about 8 minutes. Then, a 1 molar (M) $Co_3Mg_1$ (a 3:1 mole ratio mixed solution of $Co(NO_3)_2$ and $Mg(NO_3)_2$) aqueous solution was added thereto, further stirred for about 10 minutes, and then filtered to isolate a precipitate. The filtered precipitate was dried in an oven at about 150° C. for about 3 hours to prepare a dried product. The dried product was put into a furnace and then thermally treated at about 720° C. for about 5 hours while oxygen was flowed thereinto (secondary thermal treatment) to thereby prepare a second composite cathode active material.

Through the secondary thermal treatment, the second composite cathode active material including Co and Mg additionally coated on the core surface was obtained. A content of Co and Mg coated on the second composite cathode active material was about 0.75 weight percent (wt %) based on the total weight of the second composite cathode active material.

Figure 4A:
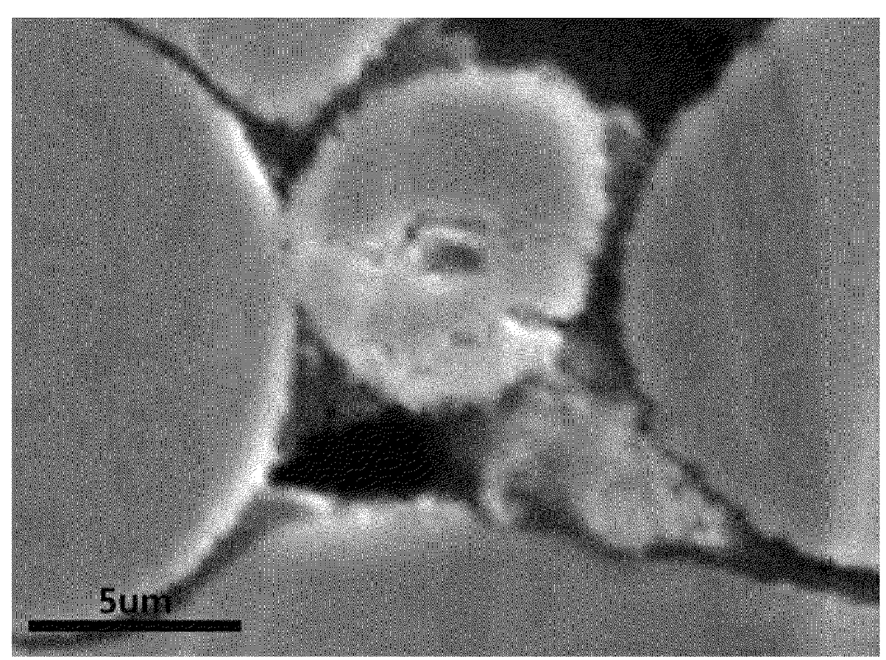
FIGS. 4A to 4D are HAADF STEM and EDS images of cross-sections of the second composite cathode active material of Example 2.
Figure 4B:
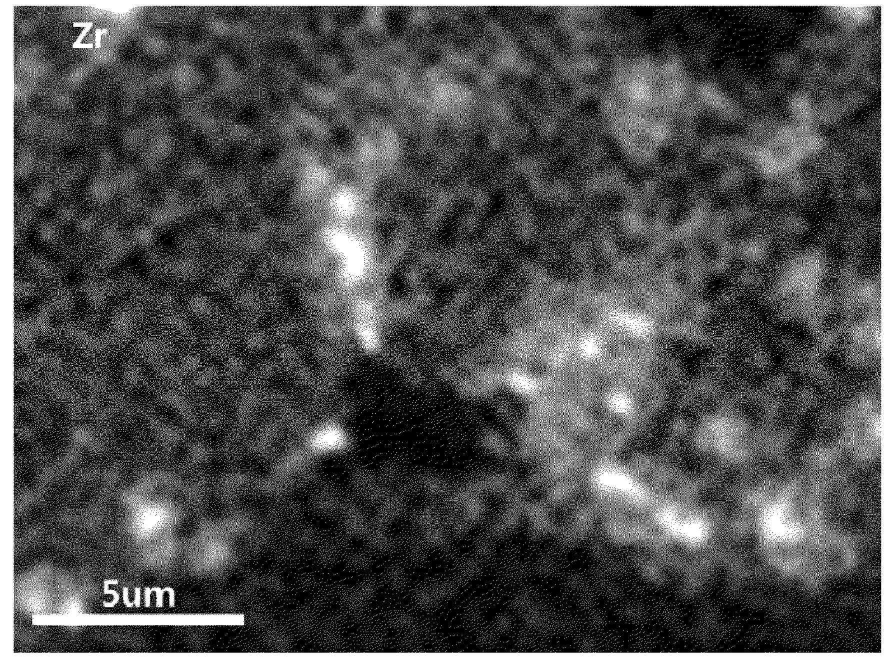
Figure 4C:
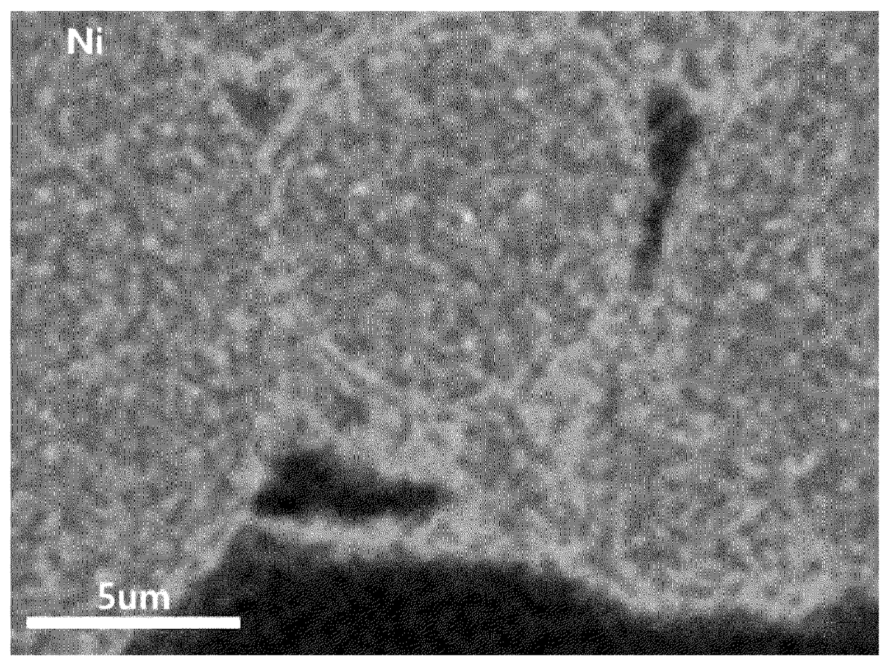
Figure 4D:
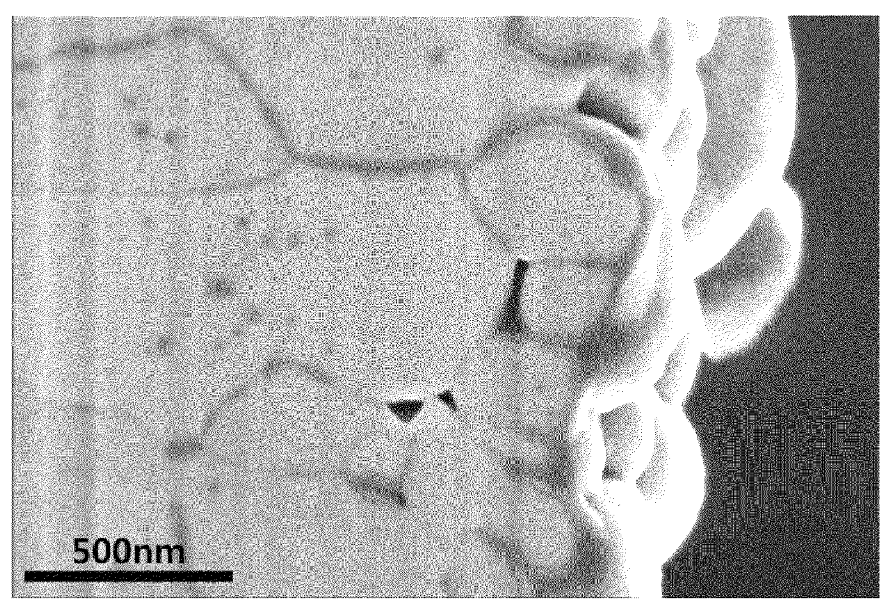

Referring to FIG. 4D, the second composite cathode active material was found to still retain the $Li_2ZrO_3$ layer having a monoclinic crystalline structure in the grain boundaries between adjacent primary particles inside of the core, and on the surface of the core.

Example 2: Ni88+Zr 0.45Mol %, Wet Method

A first composite cathode active material and a second composite cathode active material were prepared in the same manner as in Example 1, except that a molar ratio of $Ni_{0.88}Co_{0.08}Mn_{0.04}(OH)_2$ to zirconium oxynitrate in the second aqueous solution was about 1:0.0045.

Through the primary thermal treatment, the first composite cathode active material was obtained. The first composite cathode active material thus obtained included a Zr-doped $Li(Ni_{0.88}C00.08Mn_{0.04})_{1-x}Zr_xO_2$ (wherein $0<x<0.0045$) core and a $Li_2ZrO_3$ layer having a monoclinic crystalline structure was present in the grain boundaries between adjacent primary particles among the plurality of primary particles inside of the core, and on the surface of the core.

Example 3: Ni88+Zr 0.6Mol %, Wet Method

A first composite cathode active material and a second composite cathode active material were prepared in the same manner as in Example 1, except that a molar ratio of $Ni_{0.88}Co_{0.08}Mn_{0.04}(OH)_2$ to zirconium oxynitrate in the second aqueous solution was about 1:0.006.

Through the primary thermal treatment, the first composite cathode active material was obtained. The first composite cathode active material thus obtained included a Zr-doped $Li(Ni_{0.88}C00.08Mn_{0.04})_{1-x}Zr_xO_2$ (wherein $0<x<0.006$) core and a $Li_2ZrO_3$ coating layer having a monoclinic crystalline structure in the grain boundaries between adjacent primary particles among the plurality of primary particles the inside of the core, and on the surface of the core.

Comparative Example 1: Ni88, Dry Method (Preparation of First Composite Cathode Active Material: Before Washing)

$Ni_{0.88}C00.08Mn_{0.04}(OH)_2$ as a nickel-containing lithium transition metal oxide precursor and LiOH $H_2O$ as a lithium precursor were mixed in a molar ratio of about 1:1 to prepare a mixture. The mixture was put into a furnace and then thermally treated at about 750° C. for about 20 hours while oxygen was flowed thereinto (primary thermal treatment) to thereby prepare a first composite cathode active material. Through the primary thermal treatment, the first composite cathode active material including a $LiNi_{0.88}Co_{0.08}Mn_{0.04}O_2$ core was obtained.

(Preparation of Second Composite Cathode Active Material: After Washing)

A washing step, wherein 100 parts by weight of distilled water was added to 100 parts by weight of the first composite cathode active material, stirred, and then removed to remove residual lithium, was conducted one time. Subsequently, 100 parts by weight of the first composite cathode active material was added to 100 parts by weight of distilled water and stirred for about 8 minutes. Then, a 1 M $Co_3Mg_1$ (a 3:1 mole ratio mixed solution of $Co(NO_3)_2$ and $Mg(NO_3)_2$) aqueous solution was added thereto, further stirred for about 10 minutes, and then filtered to isolate a precipitate. The filtered precipitate was dried in an oven at about 150° C. for about 3 hours to prepare a dried product. The dried product was put into a furnace and then thermally treated at about 720° C. for about 5 hours while oxygen was flowed thereinto (secondary thermal treatment) to thereby prepare a second composite cathode active material.

Through the secondary thermal treatment, the second composite cathode active material including Co and Mg additionally coated on the core surface was obtained. A content of Co and Mg coated on the second composite cathode active material was about 0.75 wt % based on a total weight of the second composite cathode active material.

Comparative Example 2: Ni88+Zr 0.3Mol %, Dry Method (Preparation of First Composite Cathode Active Material: Before Washing)

Zirconium hydroxide ($Zr(OH)_4$) as a first metal precursor, $Ni_{0.88}Co_{0.08}Mn_{0.04}(OH)_2$ (Reshine New Material Co. Ltd., China) as a nickel-containing lithium transition metal oxide precursor, and LiOH $H_2O$ as a lithium precursor were mixed in a molar ratio of about 0.003:1:1 to prepare a mixture. The mixture was put into a furnace and then thermally treated at about 750° C. for about 20 hours while oxygen was flowed thereinto (primary thermal treatment) to thereby prepare a first composite cathode active material.

(Preparation of Second Composite Cathode Active Material: After Washing)

100 parts by weight of distilled water was added to 100 parts by weight of the first composite cathode active material, stirred, and then washed with water one time to remove residual lithium. Subsequently, 100 parts by weight of the first cathode active material was added to 100 parts by weight of distilled water and stirred for about 8 minutes. Then, a 1M $Co_3Mg_1$ (a mixed solution of $Co(NO_3)_2$ and $Mg(NO_3)_2$) aqueous solution was added thereto and further stirred for about 10 minutes, and then filtered to isolate a precipitate. The filtered precipitate was dried in an oven at about 150° C. for about 3 hours to prepare a dried product. The dried product was put into a furnace and then thermally treated at about 720° C. for about 5 hours while oxygen was flowed thereinto (secondary thermal treatment) to thereby prepare a second composite cathode active material.

Through the secondary thermal treatment, the second composite cathode active material including Co and Mg coated on its surface was obtained. A content of Co and Mg coated on the second composite cathode active material was about 0.75 wt %.

Comparative Example 3: Ni88+Zr 0.45Mol %, Dry Method

A first composite cathode active material and a second composite cathode active material were prepared in the same manner as in Comparative Example 2, except that zirconium hydroxide ($Zr(OH)_4$) as a first metal precursor, $Ni_{0.88}Co_{0.08}Mn_{0.04}(OH)_2$ (Reshine New Material Co. Ltd., China) as a nickel-containing lithium transition metal oxide precursor, and LiOH $H_2O$ as a lithium precursor were mixed in a molar ratio of about 0.0045:1:1 to prepare a mixture.

Comparative Example 4: Ni88+Zr 0.6Mol %, Dry Method

A first composite cathode active material and a second composite cathode active material were prepared in the same manner as in Comparative Example 2, except that zirconium hydroxide ($Zr(OH)_4$) as a first metal precursor, $Ni_{0.88}Co_{0.08}Mn_{0.04}(OH)_2$ (Reshine New Material Co. Ltd., China) as a nickel-containing lithium transition metal oxide precursor, and LiOH $H_2O$ as a lithium precursor were mixed in a molar ratio of about 0.006:1:1 to prepare a mixture.

(Manufacture of Lithium Battery (Half Cell): Using First Composite Cathode Active Material)

Example 4

(Manufacture of Cathode)

The first composite cathode active material prepared in Example 1, a carbon conducting material (Denka Black), and polyvinylidene fluoride (PVdF) were mixed at a weight ratio of 92:4:4 to prepare a mixture, and the mixture was mixed with N-methylpyrrolidone (NMP) in an agate mortar to prepare a slurry. The slurry was bar-coated on an aluminum current collector having a thickness of 15 μm, dried at room temperature, dried once more in a vacuum at 120° C., and then roll-pressed and punched to manufacture a cathode plate having a thickness of 55 μm.

(Manufacture of Coin Cell)

A coin cell was manufactured using the cathode plate manufactured above, lithium metal as a counter electrode, a PTFE separator, and an electrolyte solution prepared by dissolving 1.25 M of $LiPF_6$ in a mixture of ethylene carbonate (EC), ethylmethyl carbonate (EMC), and dimethyl carbonate (DMC) at a volume ratio of 3:4:3.

Examples 5 and 6

Coin cells were manufactured in the same manner as in Example 4, except that the first composite cathode active materials prepared in Examples 2 and 3 were used, respectively, instead of the first composite cathode active material prepared in Example 1.

Comparative Examples 5 to 8

Coin cells were manufactured in the same manner as in Example 4, except that the first composite cathode active materials prepared in Comparative Examples 1 to 4 were used, respectively, instead of the first composite cathode active material prepared in Example 1.

(Manufacture of Lithium Battery (Half Cell): Using Second Composite Cathode Active Material)

Example 7

(Manufacture of Cathode)

The second composite cathode active material prepared in Example 1, a carbonaceous conducting agent (Denka Black), and polyvinylidene fluoride (PVdF) were mixed in a weight ratio of 92:4:4 to prepare a mixture. The mixture was mixed with N-methyl-pyrrolidone (NMP) by using an agate mortar to prepare a slurry. The slurry was bar-coated on an aluminum current collector having a thickness of about 15 μm, dried at room temperature, dried further in a vacuum at 120° C., and then roll-pressed and punched to manufacture a cathode plate having a thickness of about 55 μm.

(Manufacture of Coin Cell)

The cathode plate was used as a cathode, a lithium metal was used as a counter electrode, a PTFE separator was used as a separator, and a solution prepared by dissolving 1.15 M of $LiPF_6$ in a solvent mixture including ethylene carbonate (EC), ethylmethylcarbonate (EMC) and dimethyl carbonate (DMC) in a volume ratio of 3:4:3 was used as an electrolyte to manufacture a coin cell.

Examples 8 and 9

Coin cells were manufactured in the same manner as in Example 7, except that the second composite cathode active materials prepared in Examples 2 and 3 were used, respectively, instead of the second composite cathode active material prepared in Example 1.

Comparative Examples 9 to 12

Coin cells were manufactured in the same manner as in Example 7, except that the second composite cathode active materials prepared in Comparative Examples 1 to 4 were used, respectively, instead of the second composite cathode active material prepared in Example 1.

Evaluation Example 1: X-Ray Diffraction (XRD) Spectrum Evaluation

Figure 2:
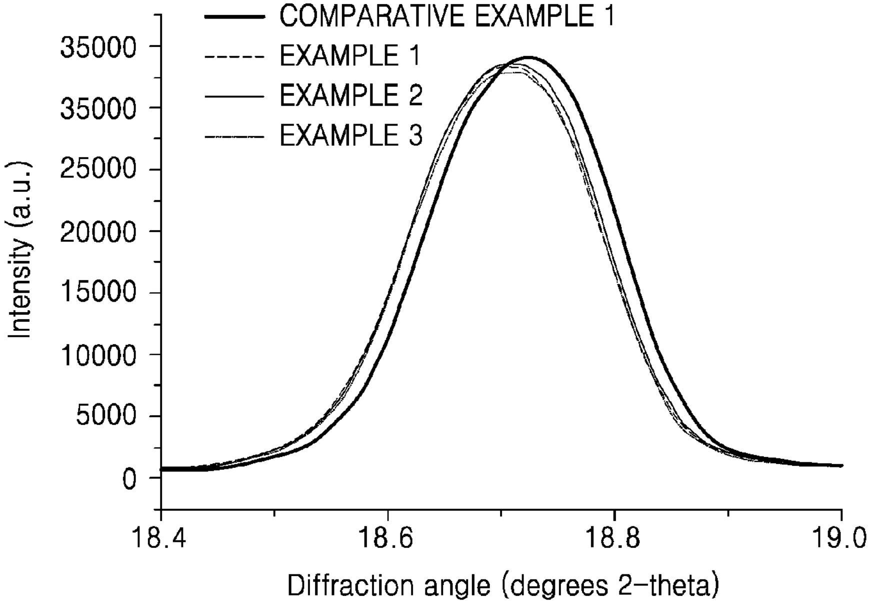
FIG. 2 a graph of intensity (arbitrary units, a.u.) versus diffraction angle (degrees 2-theta), illustrating the X-ray diffraction (XRD) spectra of first composite cathode active materials prepared in Examples 1 to 3 and Comparative Example 1.

Referring to FIG. 2, in the XRD spectra of the first composite cathode active materials of Examples 1 to 3 and Comparative Example 1, the (104) peak diffraction angle exhibited by the first composite cathode active materials of Examples 1 to 3 was shifted to a lower angle due to the doping of Zr, as compared with the first composite cathode active material of Comparative Example 1. This indicates that a lattice expansion occurred due to the deposition of Zr at the octahedral site of a transition metal layer in the layered structure of the nickel-containing lithium transition metal oxide, thus further stabilizing the layered structure.

In addition, when the doping concentration of Zr was increased as in Examples 2 and 3, relative to Example 1, a further peak shift did not occur. This indicates that a part of the Zr added to prepare the first composite cathode active materials in Examples 1 to 3 was doped, and the remaining Zr was used to form a second phase ($Li_2ZrO_3$). The second phase ($Li_2ZrO_3$) had a monoclinic crystalline structure.

Evaluation Example 2: Residual Surface Lithium Content Measurement

Residual surface lithium contents in the second composite cathode active materials prepared in Examples 1 to 3 and Comparative Example 1 were measured. The results are shown in Table 1.

The residual surface lithium contents were measured as an amount of Li from such as $Li_2CO_3$ and LiOH remaining on the surface of each second composite cathode active material by using a wet method (or a titration method).

Details of the measurement method are disclosed in JP 2016-081903 (see paragraph [0054]), the content of which is incorporated herein by reference.

TABLE 1

| Example | Residual surface lithium content [ppm*] |
|---|---|
| Comparative Example 1 | 2197 |
| Example 1 | 1582 |
| Example 2 | 1324 |
| Example 3 | 998 |

*parts per million (ppm)

Referring to Table 1, the second composite cathode active materials of Examples 1 to 3 were found to include lower amounts of residual surface lithium as compared to the second composite cathode active material of Comparative Example 1.

This is attributed to the residual surface lithium on the nickel-containing lithium transition metal oxide material forming the coating layer having a monoclinic crystalline structure on the surface and inside of the core by reaction with the first metal precursor.

Therefore, in a lithium battery including any of the second composite cathode active materials of Examples 1 to 3, gas generation during charging and discharging and lifetime characteristic deterioration may be suppressed as compared to a lithium battery including the second composite cathode active material of Comparative Example 1.

Evaluation Example 3: Evaluation of Inner and Surface Compositions of Core

Figure 3A:
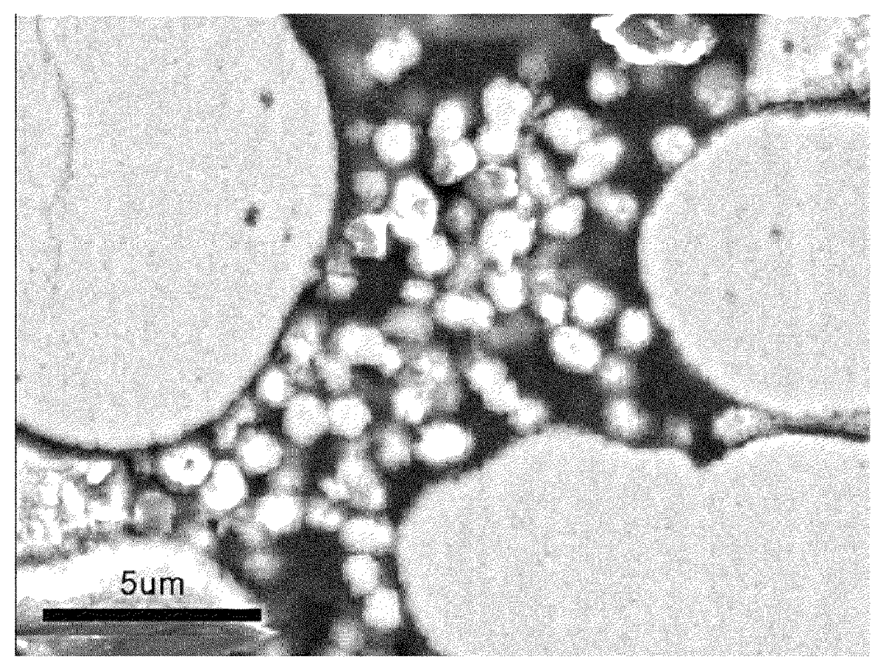
FIGS. 3A a 3D are high-angle annular dark-field scanning transmission electron microscopy (HAADF STEM) and energy dispersive X-ray spectroscopy (EDS) images of cross-sections of a second composite cathode active material prepared in Comparative Example 3.
Figure 3B:
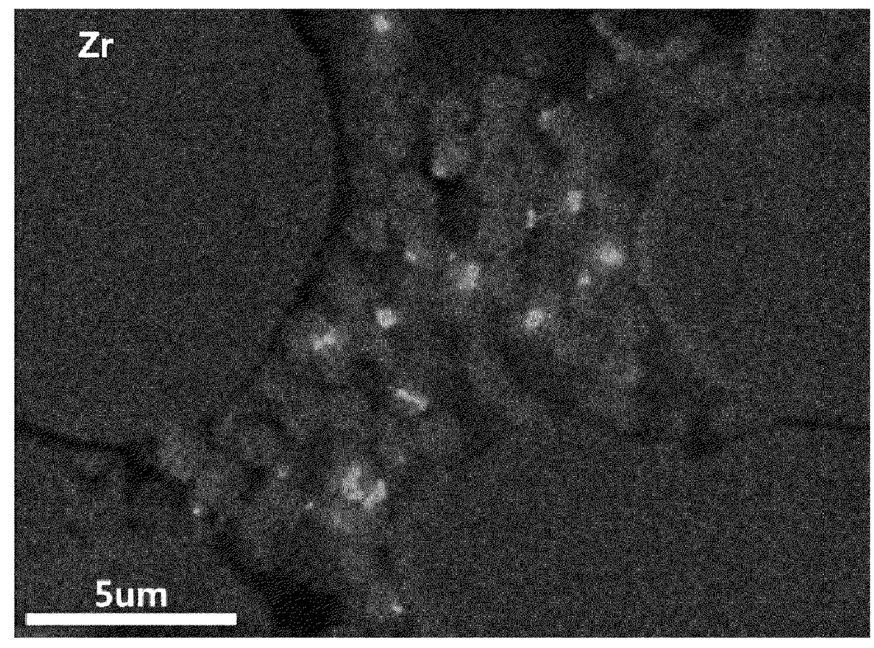
Figure 3C:
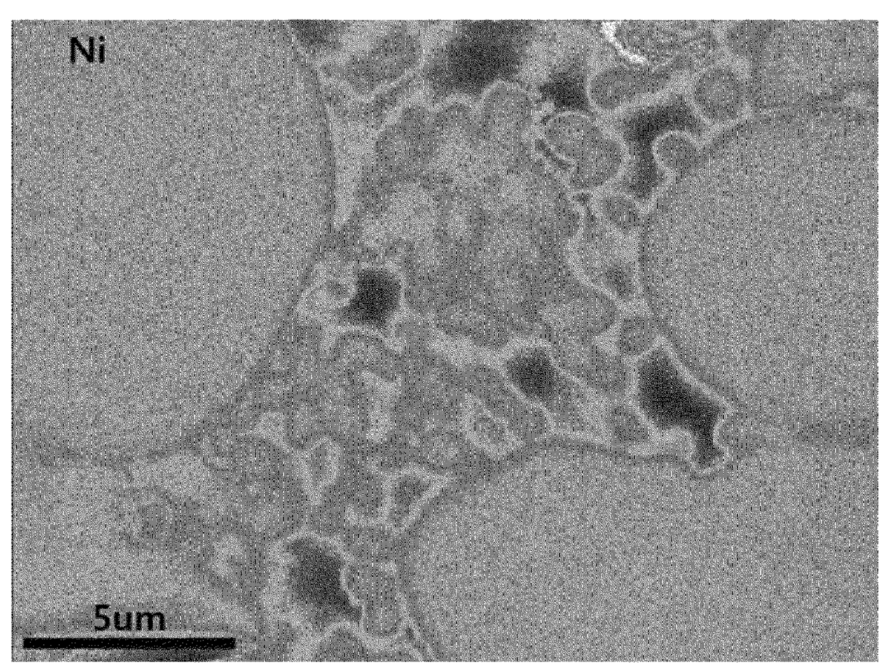
Figure 3D:
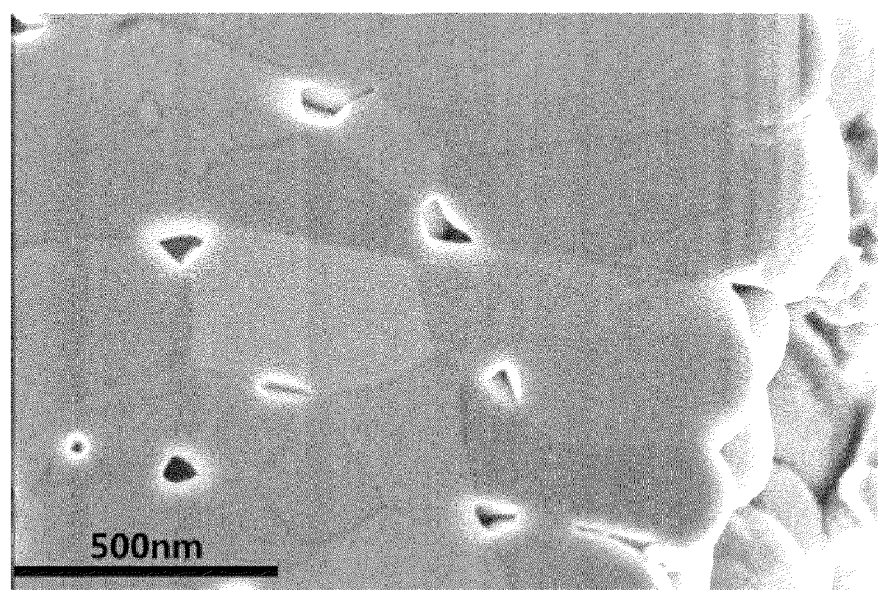

FIGS. 3A to 3D are high-angle annular dark-field scanning transmission electron microscope (HAADF STEM) and energy dispersive X-ray spectroscope (EDS) images of cross-sections of the second composite cathode active material of Comparative Example 3, including the core as an aggregate of the primary particles. FIG. 3D is a magnified high-resolution image of a cross-section of a core of the second composite active material of Comparative Example 3.

FIGS. 4A to 4D are HAADF STEM and EDS images of cross-sections of the second composite cathode active material of Example 2 including the core as an aggregate of the plurality of primary particles. FIG. 4D is a magnified high-resolution image of a cross-section of a core of the second composite cathode active material of Example 2.

Referring to FIGS. 3C and 4C, the second composite cathode active materials of Comparative Example 3 and Example 2 were found to have a uniform distribution of Ni in the core.

However, as shown in FIGS. 3B and 4B, it was found that the second composite cathode active material of Comparative Example 3 did not include Zr in the core, while the second composite cathode active material of Example 2 included Zr distributed in the core.

Referring to FIG. 3D, in the second composite cathode active material of Comparative Example 3, no additional phase including Zr appeared at the grain boundaries between the primary particles in the core or on the core surface.

However, as illustrated in FIG. 4D, in the second composite cathode active material of Example 2, an additional phase including Zr appeared at the grain boundaries between the primary particles in the core and on the core surface. Accordingly, it was confirmed that $Li_2ZrO_3$ was uniformly coated on the core surface and at the grain boundaries between the primary particles inside the core of the second composite cathode active material of Example 2.

In the composite cathode active materials of Comparative Examples 2 to 4 prepared using a dry method, the introduction of Zr at the grain boundaries between the primary particles in the core did not occur, whereas in the composite cathode active materials of Examples 1 to 3 prepared using a wet method, Zr was introduced at the grain boundaries present between almost all of the primary particles in the core.

Evaluation Example 4: Porosity Evaluation

A cross-section of a secondary particle in each of the second composite cathode active materials prepared in Comparative Example 3 and Example 2 was analyzed by SEM. The SEM images of the second composite active materials of Comparative Example 3 and Example 2 are shown in FIGS. 5A and 5B, respectively. A total area of the single secondary particle and a total area of pores in the secondary particle were measured based on f the SEM images of each, and by using an image analyzer, and a percent porosity was calculated using Equation 1.

Porosity [%]=(Area occupied by pores/Total cross-sectional area of a secondary particle)×100% Equation 1

The secondary particle of the second composite cathode active material prepared in Comparative Example 3 had a porosity of about 5.44%, whereas the secondary particle of the second composite cathode active material prepared in Example 2 had a porosity of about 0.76%. The second composite cathode active material of Example 2 prepared using a wet method was found to have a remarkably low porosity, due to the Zr-containing first composition disposed at the grain boundaries between the primary particles, as compared with the second composite cathode active material of Comparative Example 3 prepared using a dry method.

The second composite cathode active material of Example 2 was also found to have a remarkably small specific surface area (BET), due to the Zr-containing first composition disposed at the grain boundaries between the primary particles, as compared with the second composite cathode active material of Comparative Example 3.

Evaluation Example 5: Charge-Discharge Characteristics Evaluation (when First Composite Cathode Active Material was Used)

The lithium batteries of Examples 4 to 6 and Comparative Examples 5 to 8 were charged at about 25° C. with a constant current (CC) of 0.1 C rate until a voltage of 4.35 volts (V) (with respect to Li) was reached, and then with a constant voltage of 4.35 V (constant voltage mode) until a cutoff current of 0.05 C rate was reached, followed by discharging with a constant current of 0.1 C rate until a voltage of 2.8 V (with respect to Li) was reached ($1^{st}$ cycle, formation cycle).

After the $1^{st}$ cycle, the lithium batteries were charged at about 25° C. with a constant current of 1.0 C rate until a voltage of 4.35 V (with respect to Li) was reached, and then with a constant voltage of 4.35 V (constant voltage mode) until a cutoff current of 0.05 C rate was reached, followed by discharging with a constant current of 0.2 C rate until a voltage of 2.8 V (with respect to Li) was reached ($2^{nd}$ cycle).

After the $2^{nd}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 0.3 C rate until a voltage of 2.8 V (with respect to Li) was reached ($3^{rd}$ cycle).

After the $3^{rd}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 1 C rate until a voltage of 2.8 V (with respect to Li) was reached ($4^{th}$ cycle).

After the $4^{th}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 2 C rate until a voltage of 2.8 V (with respect to Li) was reached ($5^{th}$ cycle).

After the $5^{th}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 3 C rate until a voltage of 2.8 V (with respect to Li) was reached ($6^{th}$ cycle).

After the $6^{th}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 1 C rate until a voltage of 2.8 V (with respect to Li) was reached ($7^{th}$ cycle). This cycle was repeated under the same conditions up to and including the $56^{th}$ cycle (50 times repetition). A rest time of about 10 minutes was allowed after each charge/discharge cycle for the entire charge/discharge cycles.

The charge-discharge test results are shown in Table 2. A capacity retention rate at the $56^{th}$ cycle is defined by Equation 2.

Capacity retention rate [%]=[Discharge capacity at $56^{th}$ cycle/Discharge capacity at $7^{th}$ cycle]×100% Equation 2

TABLE 2

| Example | Capacity retention rate [%] |
|---|---|
| Comparative Example 5 (Zr = 0 mol %) | 77.4 |
| Comparative Example 6 (Zr = 0.3 mol %) | 89.2 |
| Comparative Example 7 (Zr = 0.45 mol %) | 89.2 |
| Comparative Example 8 (Zr = 0.6 mol %) | 89.4 |
| Example 4 (Zr = 0.3 mol %) | 94.9 |
| Example 5 (Zr = 0.45 mol %) | 93.6 |
| Example 6 (Zr = 0.6 mol %) | 95.0 |

Referring to Table 2, the lithium batteries of Examples 4 to 6 were found to have remarkably improved capacity retention rate, as compared with the lithium battery of Comparative Example 5. Without being limited by theory, the improvement in the lifetime characteristics are attributed to the doping of Zr in the crystalline structure of the nickel-containing lithium transition metal oxide of the first composite cathode active material used in the lithium batteries of Examples 4 to 6, leading to improvement in the structural stability of the first composite cathode active material.

The lithium batteries of Examples 4 to 6 were also found to have improved capacity retention rate, as compared with the lithium batteries of Comparative Examples 6 to 8. Without being limited by theory, these improved lifetime characteristics are attributed to the fact that a second phase (monoclinic phase, $Li_2ZrO_3$) was disposed in the grain boundaries between the primary particles inside the core as well as on the core surface of the first composite cathode active material used in the lithium batteries of Examples 4 to 6, to coat the primary particles in the core, thereby suppressing a side reaction between the primary particles and an electrolyte and also suppressing the release of a transition metal from the primary particles. Further, two-dimensional transfer paths of lithium ions were secured due to the second phase on the surface and the inside of the core.

Evaluation Example 6: Charge-Discharge Characteristics Evaluation (when Second Composite Cathode Active Material was Used)

The lithium batteries of Examples 7 to 9 and Comparative Examples 9 to 12 were charged at about 25° C. with a constant current (CC) of 0.1 C rate until a voltage of 4.35 V (with respect to Li) was reached, and then with a constant voltage of 4.35 V (constant voltage mode) until a cutoff current of 0.05 C rate was reached, followed by discharging with a constant current of 0.1 C rate until a voltage of 2.8 V (with respect to Li) was reached ($1^{st}$ cycle, formation cycle).

After the $1^{st}$ cycle, the lithium batteries were charged at about 25° C. with a constant current of 1.0 C rate until a voltage of 4.35 V (with respect to Li) was reached, and then with a constant voltage of 4.35 V (constant voltage mode) until a cutoff current of 0.05 C rate was reached, followed by discharging with a constant current of 0.2 C rate until a voltage of 2.8 V (with respect to Li) was reached ($2^{nd}$ cycle).

After the $2^{nd}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 0.3 C rate until a voltage of 2.8 V (with respect to Li) was reached ($3^{rd}$ cycle).

After the $3^{rd}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 1 C rate until a voltage of 2.8 V (with respect to Li) was reached ($4^{th}$ cycle).

After the $4^{th}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 2 C rate until a voltage of 2.8 V (with respect to Li) was reached ($5^{th}$ cycle).

After the $5^{th}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 3 C rate until a voltage of 2.8 V (with respect to Li) was reached ($6^{th}$ cycle).

After the $6^{th}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 1 C rate until a voltage of 2.8 V (with respect to Li) was reached ($7^{th}$ cycle). This cycle was repeated under the same conditions to and including the $56^{th}$ cycle (50 times repetition). A rest time of about 10 minutes was allowed after each charge/discharge cycle for the entire charge/discharge cycles.

The charge-discharge test results are shown in Table 3. A capacity retention rate at the $56^{th}$ cycle is defined by Equation 2, and high-rate characteristics are defined by Equation 3.

Capacity retention rate [%]=[Discharge capacity at $56^{th}$ cycle/Discharge capacity at $7^{th}$ cycle]×100% Equation 2

High-rate characteristics [%]=[Discharge capacity at $4^{th}$ cycle (1C rate)/Discharge capacity at $1^{st}$ cycle (0.1 C rate)]×100% Equation 3

TABLE 3

| Example | High-rate characteristics [%] | Capacity retention rate [%] |
|---|---|---|
| Comparative Example 9 (Zr = 0 mol %) | 91.8 | 88.0 |
| Comparative Example 11 (Zr = 0.45 mol %) | 92.1 | 89.5 |
| Comparative Example 12 (Zr = 0.6 mol %) | 93.1 | 93.1 |
| Example 8 (Zr = 0.45 mol %) | 92.7 | 92.6 |
| Example 9 (Zr = 0.6 mol %) | 93.7 | 93.9 |

Referring to Table 3, the lithium batteries of Example 8 and 9 were found to have remarkably improved lifetime characteristics (capacity retention rate), as compared with the lithium battery of Comparative Example 9. The lithium batteries of Examples 8 and 9 also had improved high-rate characteristics and lifetime characteristics, based on the same amount of Zr, as compared with the lithium batteries of Comparative Example 11 and 12, respectively. Without being limited by theory, these improved high-rate characteristics and lifetime characteristics are attributed to the fact that a second phase (monoclinic phase, $Li_2ZrO_3$) was disposed at the grain boundaries between the primary particles inside the core of the second composite cathode active material used in the lithium batteries of Examples 8 and 9, to coat the primary particles, thereby suppressing surface damage of the positive active material which may occur during a washing process, effectively withstanding a volume change of the primary particles during charging and discharging, and facilitating conduction of lithium ions in the core.

As described above, according to the one or more embodiments, a composite cathode active material may include a composition having a different phase inside and on a surface of the core, and a lithium transition metal oxide doped with a first metal, and thus may improve charge and discharge characteristics of a lithium battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising a plurality of secondary particles, the secondary particles comprising:

a core comprising an aggregate of a plurality of primary particles; and a shell on the core, the shell comprising a second composition comprising at least two second metals, wherein the plurality of primary particles comprise a nickel-containing lithium transition metal oxide represented by Formula 4:

$$Li_aNi_bCo_cMn_dM3_eO_2 \quad \text{Formula 4}$$

wherein, in Formula 4, $0.9 \leq a \leq 1.1$, $0.7 < b < 1.0$, $0 < c < 0.08$, $0 < d \leq 0.1$, $0.001 < e \leq 0.0045$, $b+c+d+e=1$, and M3 is Zr, and a first composition including $Li_aZr_bO_c$ disposed in grain boundaries between adjacent primary particles of the plurality of primary particles and on a surface of the core to provide a $Li_aZr_bO_c$ shell, the $Li_aZr_bO_c$ having a monoclinic crystalline structure, where $1.9 \leq a \leq 2.1$, $0.9 \leq b \leq 1.1$, and $2.9 \leq c \leq 3.1$, wherein the second metals comprises Mg and at least one of Co or Ni, and wherein the second composition is different from the first composition, and the second composition has a crystalline structure that is different from the crystal structure of the first composition and the crystal structure of the nickel-containing lithium transition metal oxide, and wherein a total amount of the zirconium in the secondary particle is about 0.05 mol % to 0.75 mol % with respect to total moles of the transition metal and the zirconium in the nickel-containing lithium transition metal oxide.

2. The composite cathode active material of claim 1, wherein the nickel-containing lithium transition metal oxide of the core comprises a first phase and the monoclinic crystalline structure of $Li_aZr_bO_c$ as a second phase different from the first phase.

3. The composite cathode active material of claim 1, wherein the monoclinic crystalline structure of the $Li_aZr_bO_c$ belongs to a C2/m, C12/c1, or C2/c space group.

4. The composite cathode active material of claim 1, wherein the first composition consists essentially of $Li_2ZrO_3$.

5. The composite cathode active material of claim 1, wherein the core comprises a first inner region and a second inner region, wherein the first inner region extends from a center of the core to halfway between the center of the core and a surface of the core, and the second inner region extends from halfway between the center of the core and the surface of the core to the surface of the core, and 50% or greater of the grain boundaries in the first inner region comprise the $Li_aZr_bO_c$, and 50% or greater of the grain boundaries in the second inner region comprise the $Li_aZr_bO_c$.

6. The composite cathode active material of claim 1, wherein the plurality of primary particles have a polyhedral shape, and the grain boundaries between the plurality of primary particles has a substantially rectilinear form.

7. The composite cathode active material of claim 1, wherein at least one grain boundary between adjacent primary particles among the plurality of primary particles, extends in a direction parallel to adjacent surfaces of the adjacent primary particles, and at least one grain boundary extends in a direction different from a tangential direction of an outer surface of the core of the secondary particle.

8. The composite cathode active material of claim 1, wherein the core comprises a first grain boundary and a second grain boundary, and each of the first grain boundary and the second grain boundary are adjacent to a same primary particle, and wherein the first grain boundary and the second grain boundary intersect at an angle determined by a shape of the primary particle.

9. The composite cathode active material of claim 1, wherein the core comprises a plurality of grain boundaries amongst the plurality of primary particles, wherein each grain boundary of the plurality of grain boundaries extends in a direction parallel to a surface of an adjacent primary particle, and wherein each grain boundary of the plurality of grain boundaries extends in a different direction from each other.

10. The composite cathode active material of claim 1, wherein an average grain boundary length is in a range of 50 nanometers to 1000 nanometers and an average grain boundary thickness is in a range of 1 nanometer to 50 nanometers, and wherein a length direction of the grain boundary is parallel to adjacent surfaces of adjacent primary particles, and thickness direction of the grain boundary is perpendicular to adjacent surfaces of adjacent primary particles.

11. The composite cathode active material of claim 1, wherein the core has an average particle diameter of 1 micrometer to 30 micrometers, and the shell has a thickness of 5 nanometers to 40 nanometers.

12. The composite cathode active material of claim 1, wherein an amount of the zirconium in the secondary particle is about 0.05 mol % to 0.65 mol % with respect to total moles of the transition metal and the zirconium in the nickel-containing lithium transition metal oxide.

13. The composite cathode active material of claim 1, wherein an area of pores in a cross-section of the composite cathode active material is about 1% or less with respect to the total area of the cross-section.

14. A cathode comprising the composite cathode active material according to claim 1.

15. A lithium battery comprising, the cathode according to claim 14, an anode, and an electrolyte between the cathode and the anode.

16. The composite cathode active material of claim 1, wherein the second metals include Co and Mg.

17. The lithium battery of claim 15, wherein the battery exhibits a capacity retention rate of 93.6% to 94.9% as determined in accordance with Equation 2:

Capacity retention rate [%]=[Discharge capacity at $56^{th}$ cycle/Discharge capacity at $7^{th}$ cycle]×100%.    Equation 2

* * * * *